United States Patent
Lee et al.

(10) Patent No.: US 11,632,676 B2
(45) Date of Patent: Apr. 18, 2023

(54) SERVICE-BASED ACCESS STRATUM (AS) SECURITY CONFIGURATION

(71) Applicant: QUALCOMM Incorporated, San Diego, CA (US)

(72) Inventors: Soo Bum Lee, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 846 days.

(21) Appl. No.: 16/240,668

(22) Filed: Jan. 4, 2019

(65) Prior Publication Data

US 2019/0215693 A1      Jul. 11, 2019

Related U.S. Application Data

(60) Provisional application No. 62/615,375, filed on Jan. 9, 2018.

(51) Int. Cl.
| | | |
|---|---|---|
| *H04W 12/084* | (2021.01) | |
| *H04W 76/12* | (2018.01) | |
| *H04W 12/10* | (2021.01) | |
| *H04W 12/06* | (2021.01) | |
| *H04L 9/40* | (2022.01) | |
| *H04W 76/10* | (2018.01) | |
| *H04W 12/041* | (2021.01) | |

(52) U.S. Cl.
CPC ....... *H04W 12/084* (2021.01); *H04L 63/0876* (2013.01); *H04L 63/123* (2013.01);
(Continued)

(58) Field of Classification Search
CPC . H04W 12/084; H04W 12/041; H04W 76/10; H04W 76/12; H04W 12/10;
(Continued)

(56) References Cited

U.S. PATENT DOCUMENTS

| | | |
|---|---|---|
| 2009/0049196 A1 | 2/2009 | Smith et al. |
| 2014/0254523 A1 | 9/2014 | Chai et al. |

(Continued)

FOREIGN PATENT DOCUMENTS

| | | |
|---|---|---|
| CN | 101953193 A | 1/2011 |
| EP | 3738289 A1 | 11/2020 |

(Continued)

OTHER PUBLICATIONS

International Search Report and Written Opinion—PCT/US2019/012533—ISA/EPO—dated Feb. 28, 2019.
Taiwan Search Report—TW108100519—TIPO—dated May 6, 2022.

*Primary Examiner* — Cheng-Feng Huang
(74) *Attorney, Agent, or Firm* — Loza & Loza, LLP

(57) ABSTRACT

Aspects of the disclosure relate to configuration of the Access Stratum (AS) security in communication networks. The AS security may be defined by security configuration information selected for a protocol data unit (PDU) session established for a user equipment (UE). The security configuration information may be selected by a network node within a core network based on one or more of the PDU session, device type of the UE, or Quality of Service (QoS) flow within the PDU session. The security configuration information may be provided to a radio access network (RAN) serving the UE for selection of an AS security configuration that is specific to the PDU session.

36 Claims, 17 Drawing Sheets

(52) U.S. Cl.
CPC ............ *H04L 63/20* (2013.01); *H04L 63/205* (2013.01); *H04W 12/041* (2021.01); *H04W 12/06* (2013.01); *H04W 12/10* (2013.01); *H04W 76/10* (2018.02); *H04W 76/12* (2018.02)

(58) Field of Classification Search
CPC .. H04W 12/06; H04L 63/0876; H04L 63/205; H04L 63/123; H04L 63/20
See application file for complete search history.

(56) References Cited

U.S. PATENT DOCUMENTS

| | | | |
|---|---|---|---|
| 2015/0052580 A1* | 2/2015 | Delsol | H04L 63/062 |
| | | | 455/509 |
| 2015/0082444 A1* | 3/2015 | Rogers | H04W 12/08 |
| | | | 726/26 |
| 2015/0143463 A1* | 5/2015 | Baghel | H04L 63/0428 |
| | | | 726/3 |
| 2017/0055192 A1* | 2/2017 | Johansson | H04W 36/30 |
| 2017/0202033 A1 | 7/2017 | Lee et al. | |
| 2017/0332419 A1* | 11/2017 | Kim | H04L 1/1896 |
| 2019/0020688 A1 | 1/2019 | Miao et al. | |
| 2019/0215693 A1 | 7/2019 | Lee et al. | |
| 2020/0120589 A1* | 4/2020 | Velev | H04W 76/25 |

FOREIGN PATENT DOCUMENTS

| | | |
|---|---|---|
| WO | 2017104858 A1 | 6/2017 |
| WO | 2017152360 A1 | 9/2017 |
| WO | 2019139852 A1 | 7/2019 |

* cited by examiner

| SCI Index | AS Ciphering 502 | AS Integrity Protection 504 | UPF Ciphering 506 | UPF Integrity Protection 508 | QoS 510 |
|---|---|---|---|---|---|
| 1 | On | Off | Off | Off | N/A |
| 2 | On | On | Off | Off | 5 (non-GPR) |
| 3 | Off | On | On | Off | 1 (GBR) |
| 4 | Off | On | On | On | N/A |
| ... | ... | ... | ... | ... | ... |

| 602 | 604 |
|---|---|
| 256-NEA2 | Mandatory |
| 256-NEA1 | Mandatory |
| 128-NEA2 | Mandatory |
| 128-NEA1 | Mandatory |
| 256-NEA3 | Not allowed |
| 128-NEA3 | Not allowed |

| 606 | 608 |
|---|---|
| 256-NIA2 | Optional |
| 256-NIA1 | Optional |
| 128-NIA2 | Optional |
| 128-NIA1 | Optional |
| 256-NIA3 | Not allowed |
| 128-NIA3 | Not allowed |

FIG. 6

SERVICE-BASED ACCESS STRATUM (AS) SECURITY CONFIGURATION

PRIORITY CLAIM

This application claims priority to and the benefit of Provisional Patent Application No. 62/615,375 filed in the U.S. Patent and Trademark Office on Jan. 9, 2018, the entire contents of which are incorporated herein by reference as if fully set forth below in their entirety and for all applicable purposes.

TECHNICAL FIELD

The technology discussed below relates generally to wireless communication networks, and more particularly, to configuring Access Stratum (AS) security in a wireless communication network.

INTRODUCTION

Wireless access networks are widely deployed to provide various wireless communication services such as telephony, video, data, messaging, broadcasts, and so on. Wireless access networks may be connected to other wireless access networks and to core networks to provide various services, such as Internet access.

Security of communication sessions may be provided by wireless access networks to reduce the likelihood that information transmitted across wireless radio links may be manipulated or that a third party may gain unauthorized access to the user data traffic. For example, wireless access networks may support Non Access Stratum (NAS) and Access Stratum (AS) security to securely deliver control information and user data traffic over wireless radio links.

NAS security performs integrity protection and ciphering (encryption) of NAS signaling between a user equipment (UE) and a core network. AS security performs integrity protection and ciphering of Radio Resource Control (RRC) signaling between a UE and a base station in the control plane. In addition, AS security also performs ciphering of user data traffic (e.g., Internet Protocol (IP) packets) between a UE and a base station in the user plane.

As the demand for mobile broadband access continues to increase, research and development continue to advance communication technologies, including technologies for enhancing AS security in particular, not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure relate to mechanisms for configuring Access Stratum (AS) security on a per-session basis for a user equipment (UE). In some examples, during establishment of a protocol data unit (PDU) session with a core network node, the core network node may select security configuration information, such as a security configuration index (SCI), for the PDU session based on the AS security capabilities of the UE together with various policy information associated with the PDU session. For example, the policy information may be related to the PDU session and/or a data flow (e.g., Quality of Service (QoS) flow) within the PDU session, and may further be related to a device type of the UE. The SCI may be provided to a radio access network (RAN) serving the UE for selection of an AS security configuration for the PDU session. In addition, the SCI may be provided to the UE for confirmation that the selected AS security configuration complies with the SCI selected by the core network node. The SCI may further be utilized by the core network node to configure user plane function (UPF) security in the core network.

In one aspect of the disclosure, a method for configuring Access Stratum (AS) security at a user equipment (UE) in a communication network is provided. The method includes transmitting a session establishment request message to a network node within a core network to establish a protocol data unit (PDU) session and receiving an AS security configuration selected for the PDU session by a radio access network (RAN) serving the UE based on security configuration information including AS security information indicating one or more AS security options selected for the PDU session by the network node within the core network. The AS security configuration is specific to the PDU session.

Another aspect of the disclosure provides a user equipment (UE) within a communication network. The UE includes a processor, a transceiver communicatively coupled to the processor, and a memory communicatively coupled to the processor. The processor is configured to transmit a session establishment request message to a network node within a core network to establish a protocol data unit (PDU) session and receive an AS security configuration selected for the PDU session by a radio access network (RAN) serving the UE based on security configuration information including AS security information indicating one or more AS security options selected for the PDU session by the network node within the core network. The AS security configuration is specific to the PDU session.

Another aspect of the disclosure provides method for configuring Access Stratum (AS) security for a user equipment (UE) at a network node in a core network. The method includes receiving a session establishment request message from the UE at the network node within the core network, in which the session establishment request message includes a request for the UE to establish a protocol data unit (PDU) session. The method further includes identifying AS security capabilities of the UE and selecting security configuration information for the PDU session based on at least one of the AS security capabilities of the UE or policy information associated with the PDU session, in which the security configuration information includes AS security information indicating one or more AS security options selected by the network node within the core network for the PDU session. The method further includes transmitting the security configuration information to a radio access network (RAN) in wireless communication with the UE for selection of an AS security configuration for the PDU session.

Another aspect of the disclosure provides a network node in a core network. The network node includes a processor, a network interface communicatively coupled to the processor, and a memory communicatively coupled to the processor. The processor is configured to receive a session establishment request message from the UE at the network node within the core network, in which the session establishment request message includes a request for the UE to establish a protocol data unit (PDU) session. The processor is further configured to identify AS security capabilities of the UE and select security configuration information for the PDU session based on at least one of the AS security capabilities of the UE or policy information associated with the PDU session, in which the security configuration information includes AS security information indicating one or more AS security options selected by the network node within the core network for the PDU session. The processor is further configured to transmit the security configuration information to a radio access network (RAN) in wireless communication with the UE for selection of an AS security configuration for the PDU session.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 6 illustrates further exemplary formats for the SCI.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
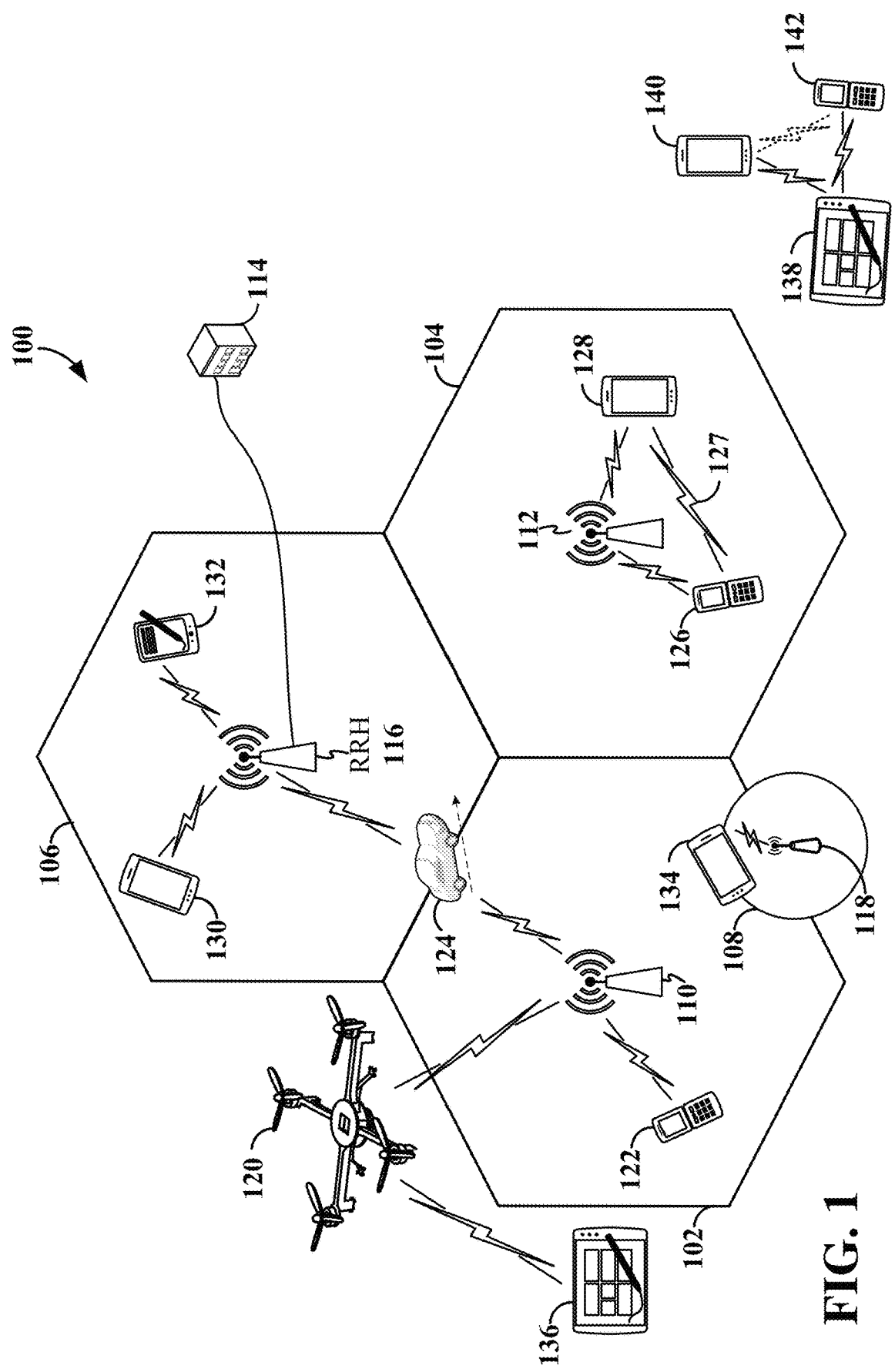
FIG. 1 is a diagram illustrating an example of a wireless radio access network.

The various concepts presented throughout this disclosure may be implemented across a broad variety of telecommunication systems, network architectures, and communication standards. Referring now to FIG. 1, as an illustrative example without limitation, a schematic illustration of a radio access network (RAN) 100 is provided. The RAN 100 may implement any suitable radio access technology (RAT) or RATs to provide radio access to a user equipment (UE). As one example, the RAN 100 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 100 may operate according to both the LTE and 5G NR standards. Of course, many other examples may be utilized within the scope of the present disclosure.

The geographic region covered by the RAN 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a RAN responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the RAN 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the RAN. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services. In examples where the RAN 100 operates according to both the LTE and 5G NR standards, a UE may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the present disclosure, two or more UE (e.g., UEs 126 and 128) may communicate with each other using peer to peer (P2P) or sidelink signals 127 without relaying that communication through a base station (e.g., base station 112).

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe/slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the RAN 100 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity.

That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

The radio protocol architecture for a RAN, such as the RAN 100 shown in FIG. 1, may take on various forms depending on the particular application. An example of a radio protocol architecture for the user and control planes is illustrated FIG. 2.

Figure 2:
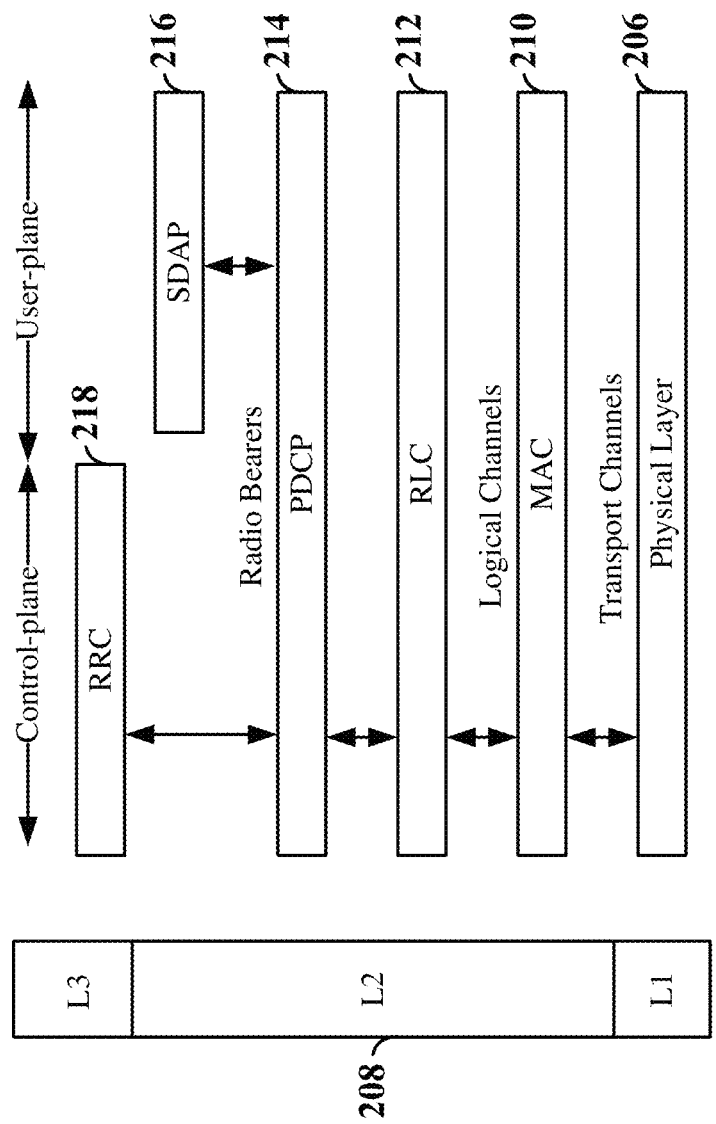
FIG. 2 is a diagram illustrating an example of a radio protocol architecture for the user and control plane.

As illustrated in FIG. 2, the radio protocol architecture for the UE and the base station includes three layers: Layer 1, Layer 2, and Layer 3. Layer 1 is the lowest layer and implements various physical layer signal processing functions. Layer 1 will be referred to herein as the physical layer 206. Layer 2 (L2 layer) 208 is above the physical layer 206 and is responsible for the link between the UE and base station over the physical layer 206.

In the user plane, the L2 layer 208 includes a media access control (MAC) sublayer 210, a radio link control (RLC) sublayer 212, a packet data convergence protocol (PDCP) 214 sublayer, and a service data adaptation protocol (SDAP) sublayer 216, which are terminated at the base station on the network side. Although not shown, the UE may have several upper layers above the L2 layer 208 including at least one network layer (e.g., IP layer and user data protocol (UDP) layer) that is terminated at the User Plane Function (UPF) on the network side.

The SDAP sublayer 216 provides a mapping between a 5G core (5GC) quality of service (QoS) flow and a data radio bearer and performs QoS flow ID marking in both downlink and uplink packets. The PDCP sublayer 214 provides packet sequence numbering, in-order delivery of packets, retransmission of PDCP protocol data units (PDUs), and transfer of upper layer data packets to lower layers. The PDCP sublayer 214 also provides header compression for upper layer data packets to reduce radio transmission overhead, security by ciphering the data packets, and integrity protection of data packets. The RLC sublayer 212 provides segmentation and reassembly of upper layer data packets, error correction through automatic repeat request (ARQ), and sequence numbering independent of the PDCP sequence numbering. The MAC sublayer 210 provides multiplexing between logical and transport channels. The MAC sublayer 210 is also responsible for allocating the various radio resources (e.g., resource blocks) in one cell among the UEs and for HARQ operations. The physical layer 206 is responsible for transmitting and receiving data on physical channels (e.g., within slots).

In the control plane, the radio protocol architecture for the UE and base station is substantially the same for the physical layer 206 and the L2 layer 208 with the exception that there is no header compression function for the control plane. The control plane also includes a radio resource control (RRC) sublayer 218 in Layer 3. The RRC sublayer 218 is responsible for establishing and configuring signaling radio bearers (SRBs) and data radio bearers (DRBs) between the bases station the UE, paging initiated by the 5GC or NG-RAN, and broadcast of system information related to Access Stratum (AS) and Non Access Stratum (NAS). The RRC sublayer 218 is further responsible for QoS management, mobility management (e.g., handover, cell selection, inter-RAT mobility), UE measurement and reporting, and security functions.

Figure 3:
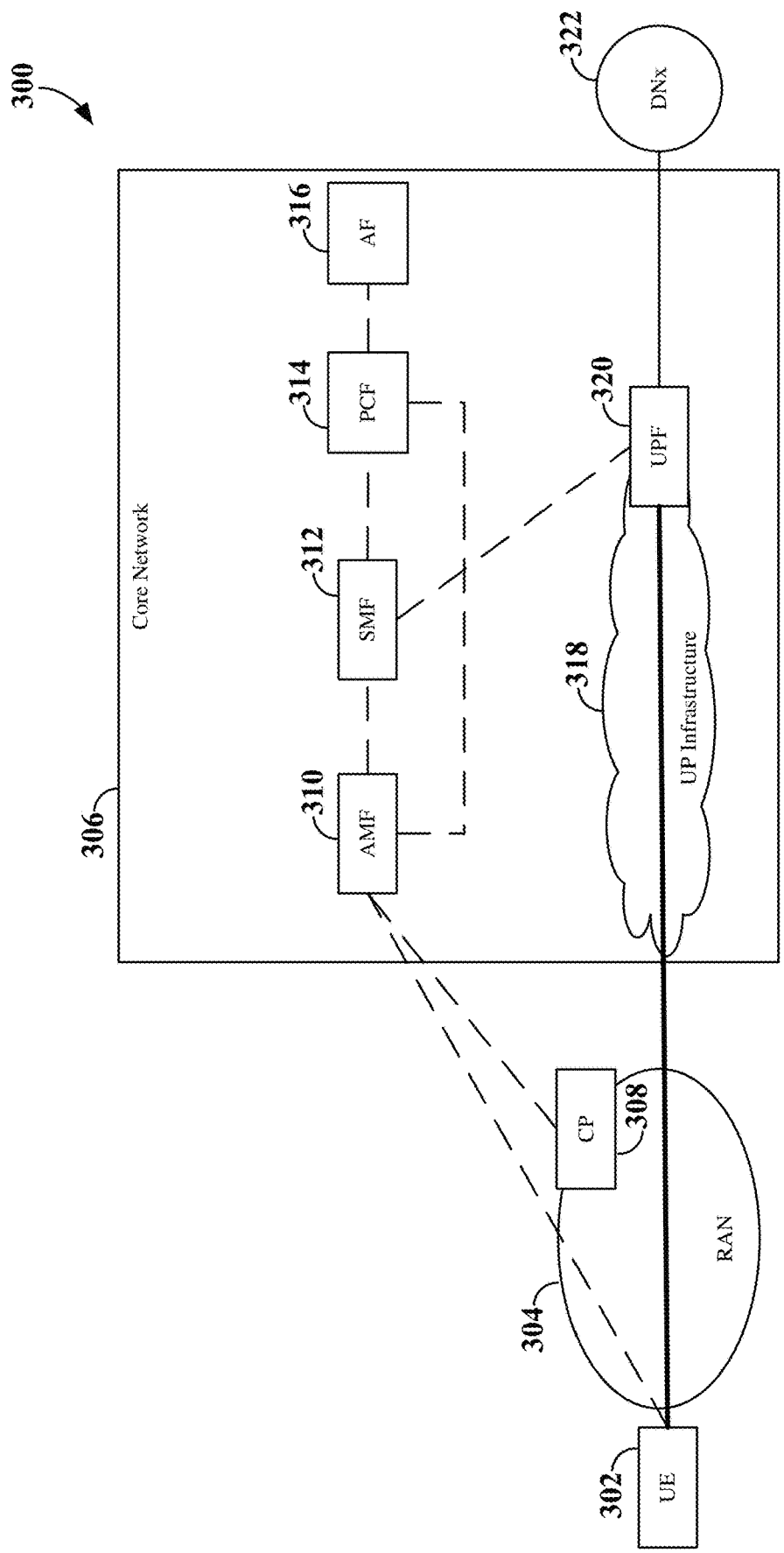
FIG. 3 is a diagram illustrating an example of a network architecture.

FIG. 3 is a diagram illustrating an example of a network architecture 300 of a next generation (e.g., 5G or NR) communication network. The network architecture 300 may include one or more user equipment (UE) 302, a next generation (e.g., 5G or NR) wireless RAN 304, and a next generation (e.g., 5G or NR) core network 306.

Figure 4:
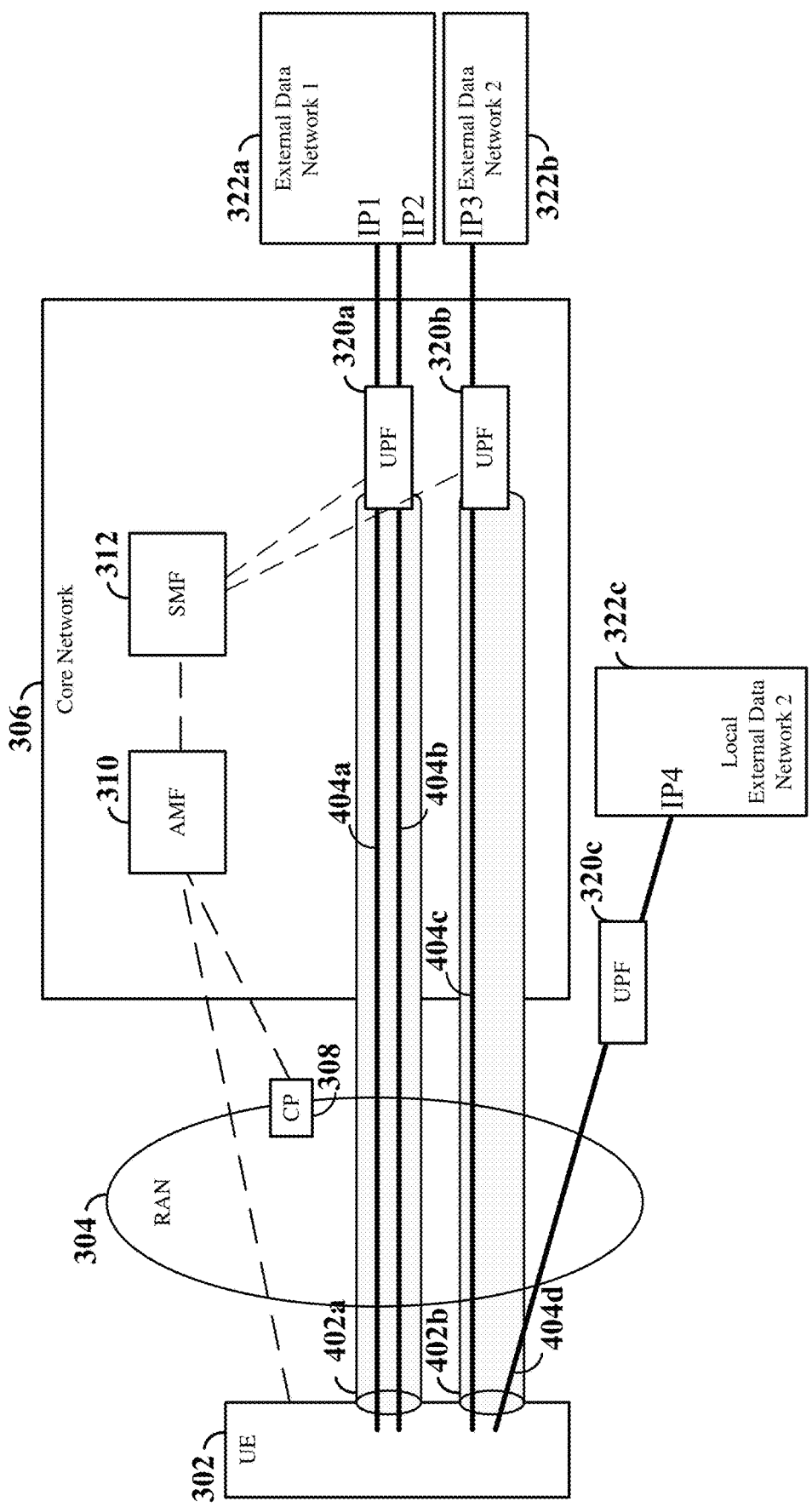
FIG. 4 diagram illustrating an example of communication utilizing multiple protocol data unit (PDU) sessions.

In this illustration, as well as in FIG. 4, any signal path between the UE 302 and the core network 306 is presumed to be passed between these entities via the RAN 304, as represented by an illustrated signal path crossing the RAN 304. Here, the RAN 304 may be the RAN 100 described above and illustrated in FIG. 1. In the description that follows, when reference is made to the RAN 304 or actions performed by the RAN 304, it may be understood that such reference refers to one or more network nodes (e.g., gNBs) in the RAN 304 that is or are communicatively coupled to the core network 306 e.g., via one or more backhaul connections.

Both user plane (UP) and control plane (CP) functionality may be supported by the UE 302, the RAN 304 and the core network 306. The UP carries the user data traffic, while the CP carriers the signaling. In FIGS. 3 and 4, CP signaling is indicated by dashed lines, while UP connections are indicated by solid lines. CP signaling between the RAN 304 and the core network 306 is illustrated via a CP node 308, which may be implemented, for example, in a RAN network node (e.g., a gNB) or distributed across two or more RAN network nodes (e.g., gNBs).

The wireless RAN 304 may be, for example, a 5G Radio Access Network (RAN), such as a New Radio (NR) RAN, or Evolved E-UTRAN (i.e., an E-UTRAN enhanced to natively connect to the next generation core network 306 with the same interface as the NR RAN). In other examples, the RAN 304 may be a next generation Wireless Local Area Network (WLAN), a next generation fixed broadband Internet access network or other type of next generation radio access network that utilizes a next generation radio access technology (RAT) to access the next generation core network 306.

The core network 306 may include, for example, a core access and mobility management function (AMF) 310, a session management function (SMF) 312, a policy control function (PCF) 314, an application function (AF) 316, a user plane infrastructure 318, and a user plane function (UPF) 320. In some examples, the AF 316 may be located outside of the core network 306, i.e., within the application service provider's network.

The AMF 310 provides mobility management, authentication, and authorization of UEs 302, while the SMF 312 processes signaling related to protocol data unit (PDU) sessions involving UEs 302 and allocates Internet Protocol (IP) addresses to UEs 302. Each PDU session may include one or more data flows (e.g., IP, Ethernet and/or unstructured data flows), each associated with a particular application. The AF 316 provides information on data flows to the PCF 314, which is responsible for policy control, in order to support a respective Quality of Service (QoS) for each data flow. Thus, the AF 316 and PCF 314 may provide flow information defining the data flow and policy information (e.g., QoS information) associated with the data flow to the SMF 312 to configure one or more QoS flows within each PDU session.

The UP infrastructure 318 facilitates routing of protocol data units (PDUs) to and from UEs 302 via the RAN 304. PDU's may include, for example, IP packets, Ethernet frames and other unstructured data (i.e., Machine-Type Communication (MTC)). The UPF 320 is connected to the UP infrastructure 318 to provide connectivity to external data networks 322. In addition, the UPF 320 may communicatively couple to the SMF 312 to enable the SMF 312 to configure the UP connection over the core network 306.

To establish a PDU session with an external data network (DN) 322 via the next generation (5G) core network 306 and the next generation RAN 304, the UE 302 may transmit a PDU session establishment request message to the next generation core network 306 via the next generation RAN 304. The PDU session establishment request message may include a set of capabilities of the UE 302. In some examples, the set of capabilities may include access stratum (AS) security capabilities of the UE. In other examples, the AS security capabilities and other UE capabilities may be discerned from a UE profile maintained in the core network 306 (e.g., within the AMF 310, SMF 312, and/or PCF 314).

AS security may be utilized, for example, to securely deliver radio resource control (RRC) messages between the UE 302 and the RAN 304 in the control plane through a signaling radio bearer (SRB) using AS security keys. In addition, AS security may be utilized to securely deliver user plane data between the UE 302 and the RAN 304 in the user plane through a data radio bearer (DRB) using AS security keys. AS security may include integrity protection, ciphering (encryption), or both integrity protection and ciphering of control plane messages (e.g., RRC messages) or user plane messages (e.g., user plane data) at the PDCP layer. For both user plane and control plane, the AS security is applied to each PDCP PDU. For example, RRC messages may be integrity protected utilizing the RRC integrity protection keys (e.g., $K_{RRCint}$) generated using a root AS security key (e.g., $K_{gNB}$) and the integrity protection algorithm, such as an algorithm based on Advanced Encryption Standard (AES), Zu Chongzhi (ZUC), or Steganographic Nature of Whitespace (SNOW). User plane messages may be integrity protected utilizing the user plane integrity protection key (e.g., $K_{UPint}$) generated using a root AS security key (e.g., $K_{gNB}$) and the integrity protection algorithm. In addition, both RRC messages and user plane messages may be encrypted utilizing respective ciphering keys generated using a root AS security key and ciphering algorithm (e.g., an algorithm based on AES, ZUC, or SNOW).

The AMF 310 and/or SMF 312 may process the PDU session establishment request message based on the set of capabilities, a UE profile, network policies, flow information, and other factors. The AMF 310 and/or SMF 312 may then establish a PDU connection for the PDU session between the UE 302 and an external data network (DN) 322 over the RAN 304 and core network 306 via the UP infrastructure 318. The PDU session may include one or more data flows and may be served by one or more UPFs 220 (only one of which is shown for convenience). Examples of data flows include, but are not limited to, IP flows, Ethernet flows and unstructured data flows.

The AMF 310 and/or SMF 312 may further use one or more of the set of capabilities, the UE profile, network policies, flow information, and other factors to select a Quality of Service (QoS) to be associated with one or more data flows within the PDU session. For example, the AMF 310 and/or SMF 312 may select one or more QoS parameters (e.g., Guaranteed Bit Rate (GBR) and/or specific QoS Class Identifiers (QCIs)) for one or more data flows within a PDU session.

Upon successfully establishing connectivity to the UE 302, the AMF 310 and/or SMF 312 may provide the AS capabilities to the RAN 304 for selection of the AS security algorithms for integrity protection and ciphering. The RAN 304 may then generate a RRC Connection Reconfiguration message including the AS security configuration (e.g., selected AS security algorithms) for the PDU session. The RAN 304 may further utilize an integrity protection key generated using the selected integrity protection algorithm to generate a message authentication code (MAC) for the RRC Connection Reconfiguration message. The RAN 304 may transmit the RRC Connection Reconfiguration message together with the associated MAC to the UE 302.

FIG. 4 is a diagram illustrating an example of an example of communication utilizing multiple PDU sessions between a UE 302 and one or more external data networks 322. In the example shown in FIG. 4, the UE 302 is actively engaged in two PDU sessions 402a and 402b. Each PDU session 402a and 402b is a logical context in the UE 302 that enables communication between a local endpoint in the UE (e.g., a web browser) and a remote endpoint (e.g. a web server in a remote host) and each PDU connection may include one or more data flows (e.g., IP, Ethernet and/or unstructured data flows).

In the example shown in FIG. 4, PDU Session 402a is served by UPF 320a and includes two IP flows 404a and 404b, each terminated at a first external data network 322a (External Data Network 1) associated with a different IP address (IP1 and IP2) of the UE 302. PDU Session 402b also includes two IP flows 404c and 404d, each associated with a different IP address (IP3 and IP4) of the UE 302. However, IP flow 404c is served by UPF 320b and terminated at a second external data network 322b (External Data Network 2), while IP flow 404d is served by a local UPF 320c and terminated at a local endpoint of the second external data network 322c (Local External Data Network 2). The session management context (e.g., leveraging software defined networking (SDN) and signaling routing) for PDU Session 402a and PDU session 402b is provided in the SMF 312. The user plane context (e.g., Quality of Service (QoS), tunneling, etc.) for PDU Session 402a is provided in the UPF 320a, while the user plane context for PDU Session 402b is provided in both UPF 320b and local UPF 320c.

In each of FIGS. 3 and 4, the AS security configuration is selected by the RAN 304 based on the AS security capabilities of the UE and network policies. However, in 5G or NR networks, various services associated with a PDU session, a QoS flow, or other type of flow may require a service-specific AS security policy. In addition, 5G or NR networks may require a specific AS security policy for a particular device (UE) type. Furthermore, 5G or NR networks may also support UPF security policies to enable integrity protection and ciphering (encryption) of user plane data over the core network 306. Thus, in various aspects of the present disclosure, the AMF 310 and/or SMF 312 may select a service-specific AS security policy and a UPF security policy for a PDU session and/or data flow.

In some examples, the AMF 310 and/or SMF 312 may use one or more of the set of capabilities, the UE profile, network policies, flow information, and other factors to select the service-specific AS security policy and UPF security policy for the PDU session. The AS security policy and UPF security policy may each be selected for the PDU session as a whole and/or for one or more data flows (e.g., QoS flows or other types of flows) within the PDU session. For example, the AS security policy may include one or more selected security algorithms (e.g., an algorithm based on AES, ZUC, or SNOW) to utilize for RRC integrity protection, RRC encryption, and user plane data encryption over the RAN 304. In examples in which the RAN 304 supports user plane data integrity protection as well as user plane data encryption, the AS security policy may further include one or more selected security algorithms to utilize for user plane data integrity protection over the RAN 304. The UPF security policy may include one or more selected security algorithms to utilize for user plane data integrity protection and encryption at the UPF 320 over the core network 306.

In various aspects of the present disclosure, the AS security policy and UPF security policy may be collectively indicated by security configuration information, such as a security configuration index (SCI). The SCI may indicate, for example, whether AS security is enabled or disabled and whether UPF security is enabled or disabled for the PDU session (or data flow). The SCI may further indicate, for example, a list of selected security algorithms for each type of security (e.g., AS/UPF integrity protection or AS/UPF ciphering). The list of selected security algorithms may further indicate whether a particular security algorithm is optional, mandatory, or not allowed to use for each security type and may further indicate an order of preference of security algorithms for each security type.

Figure 5:
FIG. 5 illustrates an exemplary format for various security configuration indexes (SCIs).

An example format for various SCIs 500 is illustrated in FIG. 5. Each SCI 500 includes an AS ciphering indicator 502 indicating whether AS ciphering is enabled or disabled, an AS integrity protection indicator 504 indicating whether AS integrity protection is enabled or disabled, a UPF ciphering indicator 506 indicating whether UPF ciphering is enabled or disabled, and a UPF integrity protection 508 indicator indicating whether UPF integrity protection is enabled or disabled. Each SCI 500 may further optionally include a QoS field 510 indicating whether a QoS parameter is associated with the SCI 500, and if so, listing the particular QoS parameter(s) (e.g., Guaranteed Bit Rate (GBR) and/or specific QoS Class Identifiers (QCIs) or 5G Quality Indicators (SQIs)) associated with the SCI 500.

In some examples, multiple AS integrity protection indicators 504 and AS ciphering indicators 502 may be included within each SCI 500 to allow security to be separately enabled/disabled for RRC messages and user plane data. Additional security indicators may further be included in each SCI 500 to enable or disable security for other types of control messages (other than RRC messages) exchanged between the RAN and the UE. Examples of other types of control messages for which security may be enabled or disabled may include, but are not limited to, status report messages, physical uplink control channels (PUCCHs), and physical downlink control channels (PDCCHs).

In the example shown in FIG. 5, for the first SCI (SCI 1), AS ciphering is enabled, while AS integrity protection, UPF ciphering, and UPF integrity protection are disabled. SCI 1 further has no QoS parameters associated therewith. For the second SCI (SCI 2), AS ciphering and AS integrity protection are enabled, while UPF ciphering and UPF integrity protection are disabled. SCI 2 further has a QCI value of 5 (non-guaranteed bit rate) associated therewith, which may require a packet delay budget of 100 ms and a packet error loss rate of $10^{-6}$. For the third SCI (SCI 3), AS integrity protection and UPF ciphering are enabled, while AS ciphering and UPF integrity protection are disabled. SCI 3 further has a QCI value of 1 (guaranteed bit rate) associated therewith, which may require a packet delay budget of 100 ms and a packet error loss rate of $10^{-2}$. For the fourth SCI (SCI 4), AS ciphering is disabled, while AS integrity protection, UPF ciphering, and UPF integrity protection are disabled. SCI 4 further has no QoS parameters associated therewith. Additional SCI (not shown) may be developed for other variations of AS/UPF security and QoS parameters.

Each SCI may further indicate the selected AS/UPF security algorithms. For example, for each security indicator 502, 504, 506, and 508, a list of possible security algorithms may be included and when a particular indicator indicates that that type of security is enabled, the selected security algorithms within the list of possible security algorithms may be indicated. Example formats of security algorithm lists to utilize for integrity protection and encryption as illustrated in FIG. 6.

FIG. 6 illustrates an exemplary format of a list of encryption security algorithms 602 for a particular encryption security type (e.g., RRC encryption, AS user plane data encryption, or UPF user plane data encryption) and an exemplary format of a list of integrity protection security algorithms 606 for a particular integrity protection security type (e.g., RRC integrity protection, AS user plane data integrity protection, or UPF user plane data integrity protection). Each encryption security algorithm 602 includes a usage indicator 604 indicating whether that encryption security algorithm 602 is mandatory, optional, or not allowed to utilize for that particular security type. In addition, each integrity protection security algorithm 606 also includes a usage indicator 608 indicating whether that integrity protection security algorithm 606 is mandatory, optional, or not allowed to utilize for that particular security type.

In the example shown in FIG. 6, there are six encryption security algorithms 602 and six integrity protection security algorithms 606 illustrated. Each encryption security algorithm 602 is designated as a New Radio Encryption Algorithm (NEA) of a particular security algorithm type. For example, type 1 (e.g., NEA1) may refer to the SNOW 3G security algorithm, type 2 (e.g., NEA2) may refer to the AES security algorithm, and type 3 (e.g., NEA3) may refer to the ZUC security algorithm. In addition, each encryption security algorithm 602 further indicates a key size of the algorithm (e.g., 128 bit or 256 bit). Similarly, each integrity protection security algorithm 606 is designated as a New Radio Integrity Protection Algorithm (NIA) of a particular security algorithm type, where NIA1 may refer to the SNOW 3G security algorithm, NIA2 may refer to the AES security algorithm, and NIA3 may refer to the ZUC algorithm. Each integrity protection security algorithm 606 may further indicate the key size (e.g., 128 bit or 256 bit).

Of the encryption security algorithms 602 listed, four of them have mandatory usage indicators 604 (e.g., 256-NEA2, 256-NEA1, 128-NEA2, and 128-NEA1) and two of them have not allowed usage indicators 604 (e.g., 256-NEA3 and 128-NEA3). Here, the mandatory usage indicator 604 indicates that one of the encryption security algorithms having the mandatory usage indicator is required to be utilized for the particular encryption security type. In addition, the not allowed usage indicator 604 indicates that neither of the encryption security algorithms having the not allowed usage indicator 604 may be utilized for the particular encryption security type.

Of the integrity protection security algorithms 606, four of them have optional usage indicators 608 (e.g., 256-NIA2, 256-NIA1, 128-NIA2, and 128-NIA1) and two of them have not allowed usage indicators 608 (e.g., 256-NIA3 and 128-NIA3). Here, the optional usage indicator 608 indicates that one of the integrity protection security algorithms having the optional usage indicator may be utilized for the particular integrity protection security type (though, none of them is required to be utilized). In addition, the not allowed usage indicator 608 indicates that neither of the integrity protection security algorithms having the not allowed usage indicator 608 may be utilized for the particular integrity protection security type.

Figure 7:
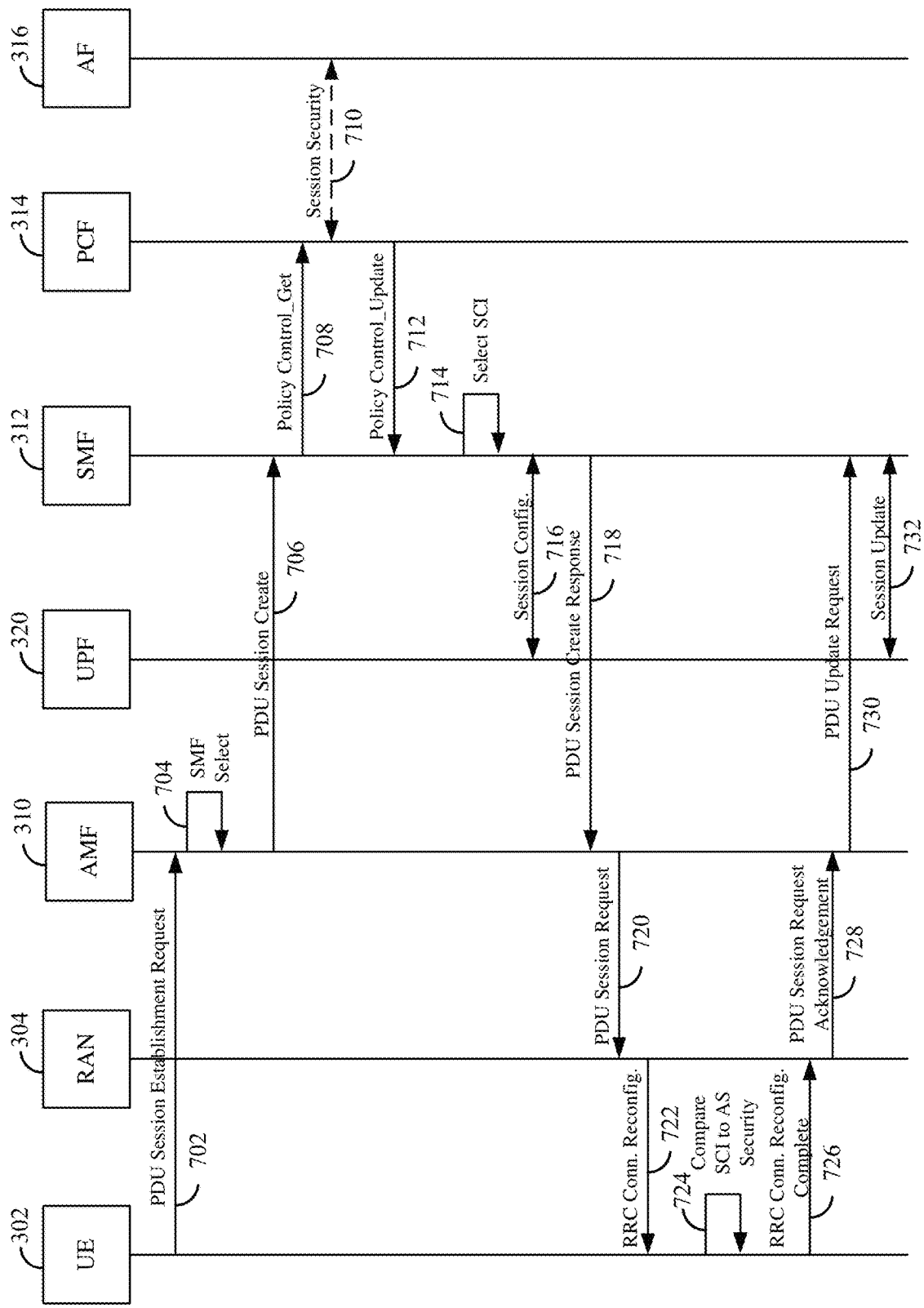
FIG. 7 is a signaling diagram illustrating exemplary signaling for configuring access stratum (AS) security.

FIG. 7 is a signaling diagram illustrating exemplary signaling to configure AS and UPF security for a protocol data unit (PDU) session. At 702, a user equipment (UE) 302 may generate and transmit a PDU session establishment request message to a network node (e.g., AMF 310) within a core network via a radio access network (RAN) serving the UE 302. The PDU session establishment request message may include, for example, a request for the UE 302 to establish a PDU session or a data flow within a PDU session with an external data network via an application function (AF) 316 associated with the application provided by the external data network. In some examples, the PDU session establishment request message may further include the access stratum (AS) security capabilities of the UE 302. In some examples, the AS security capabilities of the UE may include a list of security configuration indexes (SCIs) that may be supported by the UE 302 and/or an SCI request indicating a requested SCI to be utilized for the PDU session or data flow (QoS flow) within the PDU session. For example, the UE 302 may maintain a UE profile indicating the supported SCIs and/or the SCI to be utilized for a particular application. As another example, an application function (AF) profile for the particular application may be provisioned at the UE 302 indicating the SCI to be utilized for that particular application.

At 704, the AMF 310 may select an SMF 312 for the PDU session, and at 706, transmit a PDU session create message corresponding to the PDU session establishment request message to the SMF 312. The PDU session create message may include the AS security capabilities of the UE 302, which may also include the list of supported SCIs and/or the SCI request for the PDU session or data flow (QoS flow) within the PDU session. In some examples, the SCI may be preconfigured at the SMF 312. For example, the SMF 312 may select the SCI for the PDU session based on the local configuration at the SMF 312 and the AS security capabilities of the UE 302 without contacting the PCF 314. Otherwise, at 708, the SMF 312 may request policy information, including the SCI, for the PDU session from the PCF 314 (e.g., Policy Control_Get). In some examples, at 710, the PCF 314 may optionally retrieve policy information, such as session security information contained in UE subscription information or an AF profile, from the AF 316 for the PDU session. The session security information may include, for example, a list of one or more SCI that may be utilized for the PDU session. In some examples, the AF 316 may identify the SCI to utilize for the PDU session based on a UE subscription with the particular application and/or based on required SCI for the particular application (e.g., the AF profile may require an SCI to be selected from a list of one or more available SCI options for the application). In some examples, the session security information may indicate a list of one or more SCI to utilize for each possible device type of the UE 302.

At 712, the PCF 314 may return the policy information for the PDU session to the SMF 312. The policy information may include one or more of the UE subscription information including the session security information retrieved from the AF 316, AF profile received from the AF 316, UE subscription information maintained at the PCF 314, a UE profile maintained at the PCF 314 and/or other network policies (e.g., UPF security capabilities of the core network and/or UPF security requirements for the application). In some examples, the UE profile may indicate AS security capabilities of the UE, which may include a list of one or more SCIs supported by the UE and/or a list of one or more SCIs to be utilized for the particular application. In some examples, the policy information returned to the SMF 312 may include a selected SCI selected for the PDU session by the PCF 314 (or by the AF 316) based on the AS security capabilities of the UE 302 and other policy information associated with the PDU session (e.g., UE subscription information, device type of the UE and other network policies). In this example, the PCF 314 may transmit a message authentication code (MAC) for the SCI together with the selected SCI to the SMF 312. The MAC may be generated by the PCF 314 (or AF 316) utilizing an integrity protection key generated using a selected AS integrity protection algorithm from the selected SCI.

At 714, the SMF 312 may select the SCI for the PDU session. In some examples, if the policy information provided by the PCF 314 includes the selected SCI (e.g., together with the MAC), the SMF 312 may utilize the received SCI as the selected SCI. In other examples, the SMF 312 may select the SCI based on at least the AS security capabilities of the UE 302, policy information associated with the PDU session (or data flow within the PDU session), or any combination thereof. In some examples, the policy information may include local policy information (e.g., UE profile, UE subscription information, core network UPF security information, etc.) maintained at the AMF 310/SMF 312. In other examples, the policy information may further include the policy information retrieved from the PCF 314 for the PDU session. The AS security capabilities may be discerned from the policy information (e.g., local policy information and/or policy information retrieved from the PCF 314) or based on the AS security capabilities provided by the UE 302 together with the PDU session establishment request message. In some examples, the AS security capabilities of the UE may include a list of supported SCIs and/or an SCI request provided by the UE 302. Thus, the SMF 312 may select the SCI from the list of supported SCIs based on other policy information or may select the SCI based on the SCI request and other policy information (e.g., the SMF 312 may select the requested SCI if allowed by other policy information).

The SMF 312 may further select the SCI based on the policy information for the PDU session as a whole or for a particular data flow (QoS flow) within the PDU session. Thus, in some examples, the SMF 312 may select a respective SCI for each data flow within a PDU session, and each selected SCI may be the same as or different from other SCIs selected for other data flows within the PDU session. In this example, the policy information utilized by the SMF 312 to select the SCI may be related to not only the PDU session, but to also the particular data flow within the PDU session. For example, a data flow (QoS flow) may require a particular QoS, and the selected SCI may be selected based on the required QoS for that data flow in addition to other policy information and UE security capabilities.

The SMF 312 may further select the SCI based on the policy information related to the device type of the UE 302. For example, the UE subscription information may indicate a list of one or more SCI that may be utilized for each possible UE device type for a particular application, and the selected SCI may be selected based on the device type along with other policy information and UE security capabilities. As another example, a local policy maintained at the AMF 310/SMF 312 may indicate a particular SCI to utilize for the UE device type.

At 716, the SMF 312 may configure the UPF session security for the PDU session (or data flow within the PDU session) with the UPF 320. At 718, the SMF 312 may generate and transmit a PDU session create response message to the AMF 310. The PDU session create response message includes the selected SCI for the PDU session (or data flow). In some examples, the selected SCI may optionally further include a MAC generated using a selected AS integrity protection algorithm (e.g., one of the mandatory or optional AS integrity protection algorithms indicated in the selected SCI). The MAC may be generated by the SMF 312 or may be the MAC generated by the PCF 314 if the PCF 314 selected the SCI and transmitted the SCI and associated MAC to the SMF 312.

At 720, the AMF 310 may generate and transmit a PDU session request message to the RAN 304 (e.g., gNB) serving the UE 302 to configure the PDU session (or data flow within the PDU session) in the RAN 304. The PDU session request message includes the selected SCI (and optionally the MAC, if provided by the SMF 312). Based on the selected SCI, the RAN 304 selects an AS security configuration (e.g., control plane and user plane security configurations) for the PDU session (or data flow within the PDU session), and at 722, the RAN 304 transmits an RRC Connection Reconfiguration message to the UE 302 including the selected AS security configuration. The RRC Connection Reconfiguration message further includes the selected SCI (and optionally the MAC).

At 724, the UE 302 may verify the integrity of the received SCI using the MAC. By verifying the MAC, the UE 302 may detect whether any changes may have been made to the SCI by intermediate functions (e.g., RAN 304 or AMF 310). In addition, the UE 302 may compare the received AS security configuration to the received SCI to determine whether the received AS security configuration is included within the received SCI. The UE 302 may further compare the received AS security configuration to any requested SCI for the PDU session or data flow to determine whether the received AS security configuration is within the requested SCI.

At 726, the UE 302 may transmit an RRC Connection Reconfiguration complete message to the RAN 304. In some examples, the RRC Connection Reconfiguration complete message may include a PDU session continue/discontinue indicator that indicates whether the UE 302 is continuing or discontinuing the PDU session (or data flow within the PDU session). The UE 302 may determine to continue with the PDU session when the AS security configuration is included in the SCI and to discontinue with the PDU session when the AS security is excluded from (e.g., not included as a security option) the SCI. For example, if the AS security configuration includes an AS encryption algorithm that was not allowed in the SCI or if the SCI disabled the AS encryption, the UE 302 may discontinue the PDU session (or data flow within the PDU session). In some examples, the RRC Connection Reconfiguration complete message may further include an SCI confirmation including the received SCI (or requested SCI), together with an optional UE MAC to integrity protect the SCI confirmation transmitted from the UE.

At 728, the RAN 304 may transmit a PDU session request acknowledgement message to the AMF 310, and at 730, the AMF 310 may transmit a PDU update request message to the SMF 312. The PDU session request acknowledgement message and PDU update request message may each include the PDU session continue/discontinue indicator and optionally the SCI confirmation together with the MAC. The SMF 312 may verify the integrity of the received SCI confirmation using the UE MAC and may compare the SCI confirmation received from the UE to the selected SCI for the PDU session (or data flow) to determine whether any modifications to the selected SCI were made by intermediate functions. At 732, the SMF 312 may update the PDU session (or data flow) with the UPF 320 based on the received SCI confirmation and PDU update request. For example, if the PDU update request message includes a PDU session discontinue indicator, the SMF 312 may discontinue the PDU session (or data flow) with the UPF 320. In addition, any changes in the UPF security policy indicated by the SCI confirmation received from the UE may be made to the UPF 320 if the PDU session continue indicator is received from the UE.

Figure 8:
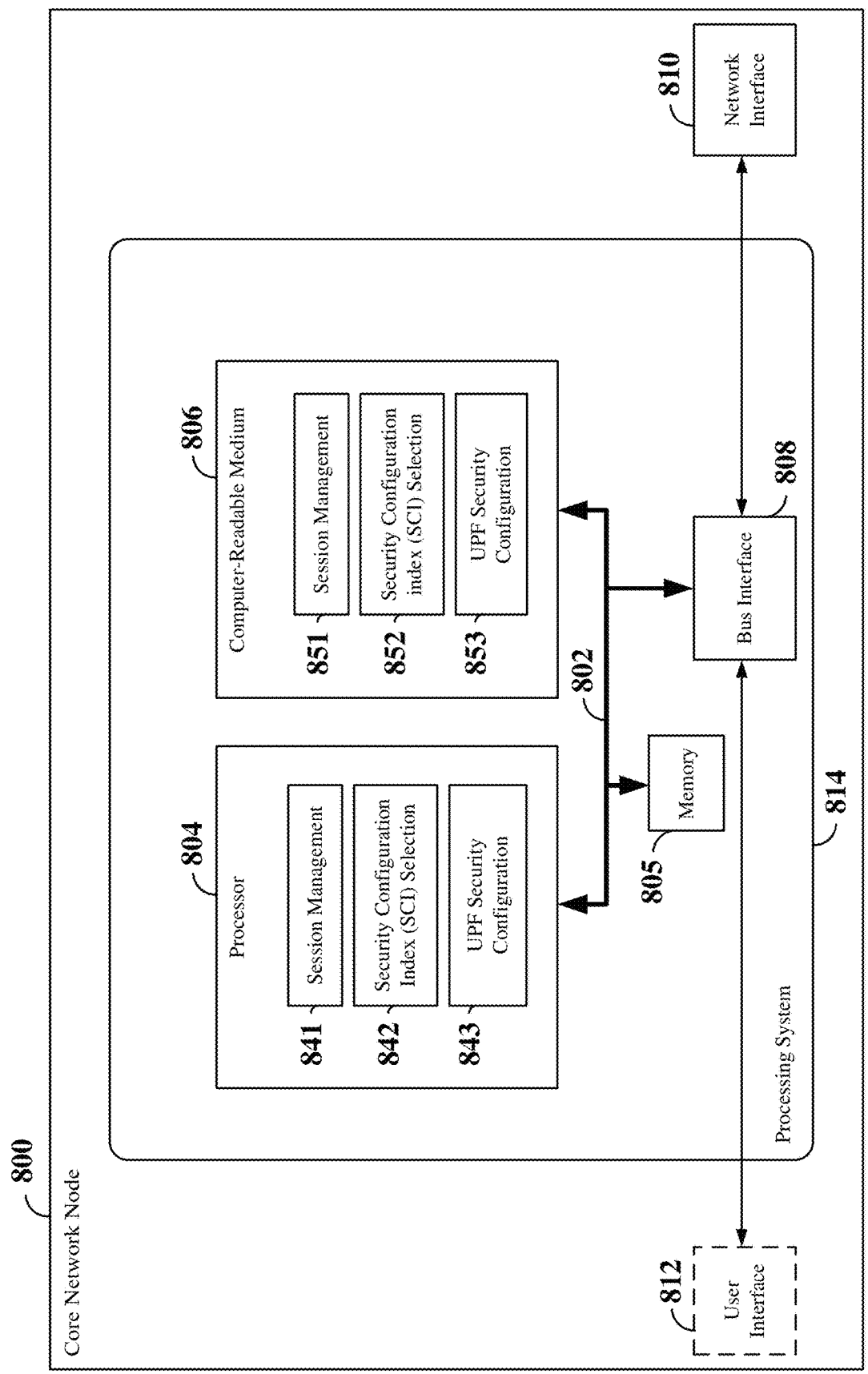
FIG. 8 is a block diagram illustrating an example of a hardware implementation for a core network node employing a processing system.

FIG. 8 is a block diagram illustrating an example of a hardware implementation for a core network node 800 employing a processing system 814. For example, the core network node may correspond to the AMF or SMF shown and described above in reference to FIGS. 3, 4, and/or 7.

The core network node 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the core network node 800 may be configured to perform any one or more of the functions described herein. That is, the processor 804, as utilized in the core network node 800, may be used to implement any one or more of the processes and procedures described below.

In this example, the processing system 814 may be implemented with a bus architecture, represented generally by the bus 802. The bus 802 may include any number of interconnecting buses and bridges depending on the specific application of the processing system 814 and the overall design constraints. The bus 802 links together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a network interface 810. The network interface 810 provides a means for communicating with various other apparatus over a transmission medium. Depending upon the nature of the apparatus, a user interface 812 (e.g., keypad, display, touch screen, speaker, microphone, joystick) may also be provided. Of course, such a user interface 812 is optional, and may be omitted in some examples.

The processor 804 is responsible for managing the bus 802 and general processing, including the execution of software stored on the computer-readable medium 806. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 804, causes the processing system 814 to perform the various functions described below for any particular apparatus. The computer-readable medium 806 and the memory 805 may also be used for storing data that is manipulated by the processor 804 when executing software.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. In some examples, the computer-readable medium 806 may be part of the memory 805. Those skilled in the art will recognize how best to implement the described functionality presented throughout this disclosure depending on the particular application and the overall design constraints imposed on the overall system.

In some aspects of the disclosure, the processor 804 may include circuitry configured for various functions. For example, the processor 804 may include session management circuitry 841 configured to receive and process a PDU session establishment request message from a UE. The PDU session establishment request message may contain a set of capabilities of the UE. The set of capabilities may include, for example, AS security capabilities of the UE, which may include a list of supported security configuration indexes (SCIs) and/or an SCI request for the PDU session. The session management circuitry 841 may process the PDU session establishment request message based on the UE capabilities, a UE profile (maintained at the core network node or retrieved from another core network node), UE subscription information, network policies, flow information, and other factors. The session management circuitry 841 may then establish a PDU connection between the UE and an external data network over the next generation RAN via the next generation core network. The session management circuitry 841 may further be configured to execute session management software 851 included on the computer-readable medium 706 to implement one or more functions described herein.

The processor 804 may further include security configuration index (SCI) selection circuitry 842 configured to select an SCI or other similar security configuration information for the PDU session (or data flow within the PDU session). The selected SCI (or security configuration information) represents an AS security policy and UPF security policy for the PDU session. The SCI (or security configuration information) may indicate, for example, whether AS security is enabled or disabled and whether UPF security is enabled or disabled for the PDU session (or data flow). The SCI (or security configuration information) may further indicate, for example, a list of selected security algorithms (e.g., AES, SNOW, and/or ZUC) for each type of security (e.g., AS/UPF integrity protection or AS/UPF ciphering). The list of selected security algorithms may further indicate whether a particular security algorithm is optional, mandatory, or not allowed to use for each security type and may further indicate an order of preference of security algorithms for each security type. In addition, the selected SCI may indicate a particular QoS for the data flow and/or PDU session.

The SCI selection circuitry 842 may select the SCI (or other similar security configuration information) based on at least the AS security capabilities of the UE and/or policy information associated with the PDU session (or data flow within the PDU session). The policy information may include, for example, local policy information (e.g., UE profile, UE subscription information, AF profile, core network UPF security information, etc.) maintained at the core network node 800 or policy information (e.g., UE profile, UE subscription information, AF profile, core network UPF security information, SCI, etc.) retrieved from another core network node. For example, the policy information may be retrieved from a policy control function (PCF) and/or application function (AF) within the core network.

The AS security capabilities may be discerned from the policy information (e.g., local policy information and/or policy information retrieved from another core network node) or based on the AS security capabilities provided by the UE within the PDU session establishment request message. In some examples, the AS security capabilities of the UE may include a list of supported SCIs and/or an SCI request provided by the UE. In some examples, the SCI selection circuitry 842 may select the SCI from the list of supported SCIs based on other policy information or may select the SCI based on the SCI request and other policy information.

The SCI selection circuitry 842 may further select the SCI (or other similar security configuration information) based on the policy information related to the device type of the UE. For example, the UE subscription information may indicate a list of one or more SCI that may be utilized for each possible UE device type for a particular application, and the selected SCI may be selected based on the device type along with other policy information and UE security capabilities. As another example, a local policy maintained at the core network node may indicate a particular SCI to utilize for the UE device type. The SCI selection circuitry may further be configured to execute SCI selection software 852 included on the computer-readable medium 806 to implement one or more functions described herein.

The processor 804 may further include UPF security configuration circuitry 843 configured to utilize the SCI to configure the UPF security within the core network. For example, the SCI may indicate the UPF security policy for the PDU session and/or data flow within the PDU session and the UPF security configuration circuitry 843 may implement the UPF security policy with the UPF within the core network. The UPF security configuration circuitry 843 may further be configured to execute UPF security configuration software 853 included on the computer-readable medium to implement one or more functions described herein.

Figure 9:
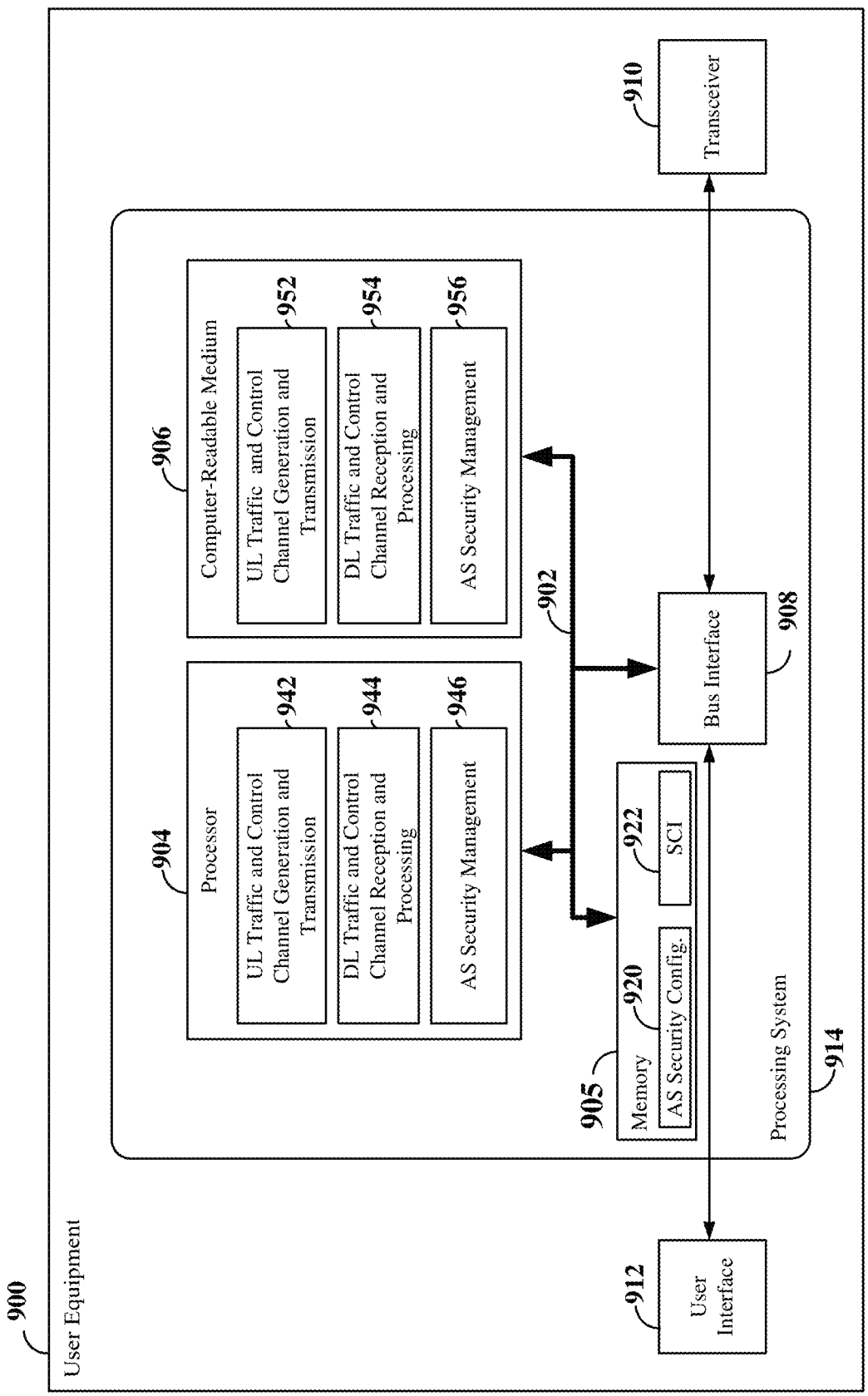
FIG. 9 is a block diagram illustrating an example of a hardware implementation for a user equipment employing a processing system.

FIG. 9 is a diagram illustrating an example of a hardware implementation for an exemplary UE 900 employing a processing system 914 that includes one or more processors 904. For example, the UE may correspond to any of the UEs illustrated in FIGS. 1, 3, 4, and/or 7.

The processing system 914 may be substantially the same as the processing system 814 illustrated in FIG. 8, including a bus interface 908, a bus 902, memory 905, a processor 904, and a computer-readable medium 906. Furthermore, the UE 900 may include a user interface 912 and a transceiver 910 for communicating with various other apparatus over a transmission medium (e.g., air interface). The processor 904, as utilized in a UE 900, may be used to implement any one or more of the processes described below.

In some aspects of the disclosure, the processor 904 may include uplink (UL) traffic and control channel generation and transmission circuitry 942, configured to generate and transmit uplink user data traffic on an UL traffic channel, and to generate and transmit uplink control/feedback/acknowledgement information on an UL control channel. In various aspects of the disclosure, the UL traffic and control channel generation and transmission circuitry 942 may be configured to generate and transmit a PDU session establishment request message to a core network to establish a PDU session (or data flow within a PDU session) with an external data network. The PDU session establishment request message may include AS security capabilities of the UE, which may include, for example, a list of supported SCIs and/or an SCI request for the PDU session (or data flow). The UL traffic and control channel generation and transmission circuitry 942 may be configured to execute UL traffic and control channel generation and transmission software 952 included on the computer-readable medium 806 to implement one or more functions described herein.

The processor 904 may further include downlink (DL) traffic and control channel reception and processing circuitry 944, configured for receiving and processing downlink user data traffic on a DL traffic channel, and to receive and process control information on one or more DL control channels. In some examples, received downlink user data traffic and/or control information may be stored within memory 905. In various aspects of the disclosure, the DL traffic and control channel reception and processing circuitry 944 may be configured to receive an RRC connection reconfiguration message from a RAN (e.g., gNB) serving the UE that includes a selected AS security configuration 920 for the PDU session. In some examples, the RRC connection reconfiguration message may further include a selected SCI (or other similar security configuration information) 922 for the PDU session. In some examples, the selected SCI 922 may further include a MAC for integrity protection of the SCI. The AS security configuration 920 and SCI 922 may be stored, for example, within memory 905. The DL traffic and control channel reception and processing circuitry 944 may further be configured to execute DL traffic and control channel reception and processing software 954 included on the computer-readable medium 806 to implement one or more functions described herein.

The processor 904 may further include access stratum (AS) security management circuitry 946, configured to compare the AS security configuration selected by the RAN for the PDU session (or data flow) to the SCI selected by the core network for the PDU session (or data flow). The AS security management circuitry 946 may further be configured to generate and transmit an RRC connection reconfiguration complete message or other similar message to the RAN that includes a PDU session continue/discontinue indicator indicating whether the UE is continuing the PDU session or discontinuing the PDU session. The AS security management circuitry 946 may continue the PDU session when the AS security configuration is included within the SCI and may discontinue the PDU session when the AS security configuration is excluded from the SCI (e.g., the SCI does not allow the particular AS security configuration selected by the RAN). The AS security management circuitry 946 may further include the received SCI, optionally together with a UE MAC), within the RRC connection reconfiguration complete message to provide the core network with a copy of the received SCI.

The AS security management circuitry 946 may further be configured to implement or apply the AS security configuration selected for the PDU session. In some examples, the AS security management circuitry 946 may be configured to apply the AS security configuration selected for the PDU session upon determining to continue with the PDU session. The AS security management circuitry 946 may further be configured to execute AS security software 956 included on the computer-readable medium 806 to implement one or more functions described herein.

Figure 10:
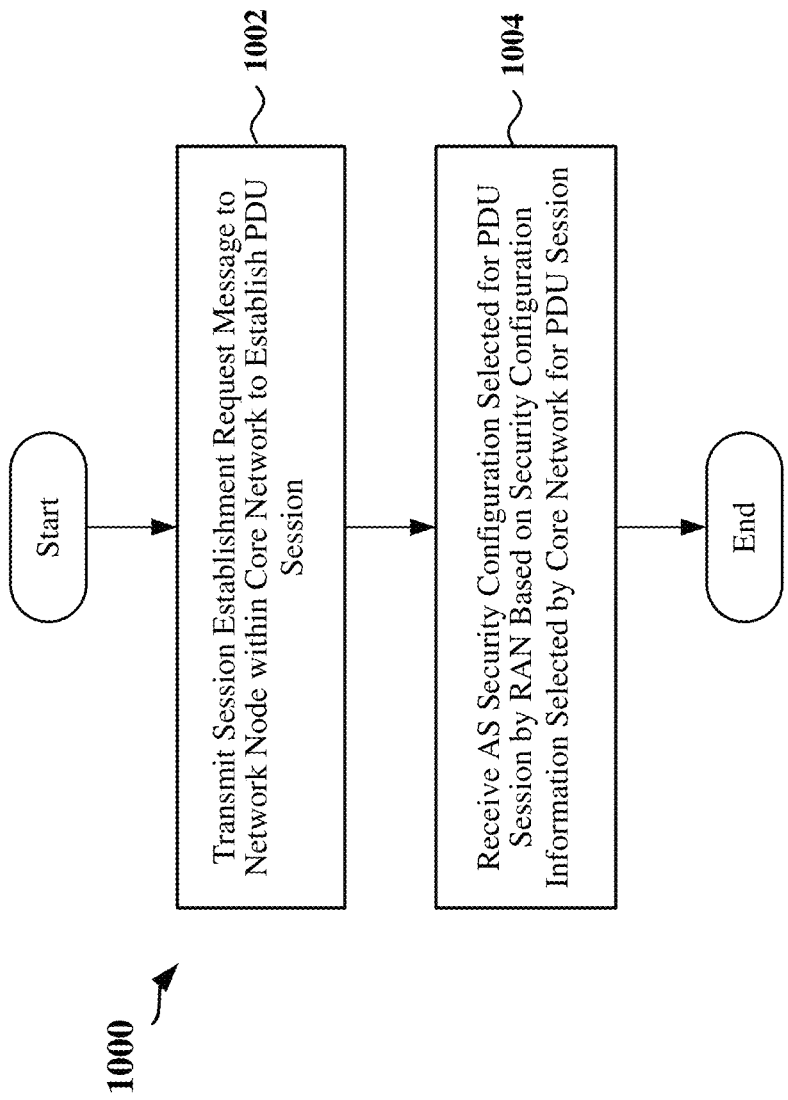
FIG. 10 is a flow chart of an exemplary method for configuring access stratum (AS) security at a user equipment in a communication network.

FIG. 10 is a flow chart 1000 of a method for configuring access stratum (AS) security at a user equipment (UE) in a communication network. As described below, some or all illustrated features may be omitted in a particular implementation within the scope of the present disclosure, and some illustrated features may not be required for implementation of all embodiments. In some examples, the method may be performed by the UE 900, as described above and illustrated in FIG. 9, by a processor or processing system, or by any suitable means for carrying out the described functions.

At block 1002, the UE may transmit a session establishment request message to a network node within a core network to establish a protocol data unit (PDU) session or data flow within a PDU session with an external data network. In some examples, the session establishment request message may include AS security capabilities of the UE. In some examples, the AS security capabilities may include a list of UE-supported security configuration indexes (SCIs) and/or an SCI request for the PDU session. For example, the UL traffic and control channel generation and transmission circuitry 942 and transceiver 910 shown and described above in connection with FIG. 9 may generate and transmit the session establishment request message.

At block 1004, the UE may receive an AS security configuration selected for the PDU session by a radio access network (RAN) serving the UE. The AS security configuration may indicate, for example, the particular AS security algorithm(s) selected for AS integrity protection and/or AS ciphering of various types of information/user data traffic (e.g., RRC messages (control plane messages), user plane data (PDUs) and/or other types of control messages). For example, the AS security configuration may indicate an AS security algorithm selected for AS integrity protection of RRC messages and an AS security algorithm selected for AS ciphering of PDUs. The AS security configuration may be transmitted, for example, within a RRC connection reconfiguration message transmitted by the RAN (e.g., gNB). The AS security configuration may be selected by the RAN based on security configuration information, such as a security configuration index (SCI), including AS security information indicating one or more AS security options selected by the network node within the core network for the PDU session (or data flow). For example, the DL traffic and control channel reception and processing circuitry 944 and transceiver 910 shown and described above in connection with FIG. 9 may receive the AS security configuration.

Figure 11:
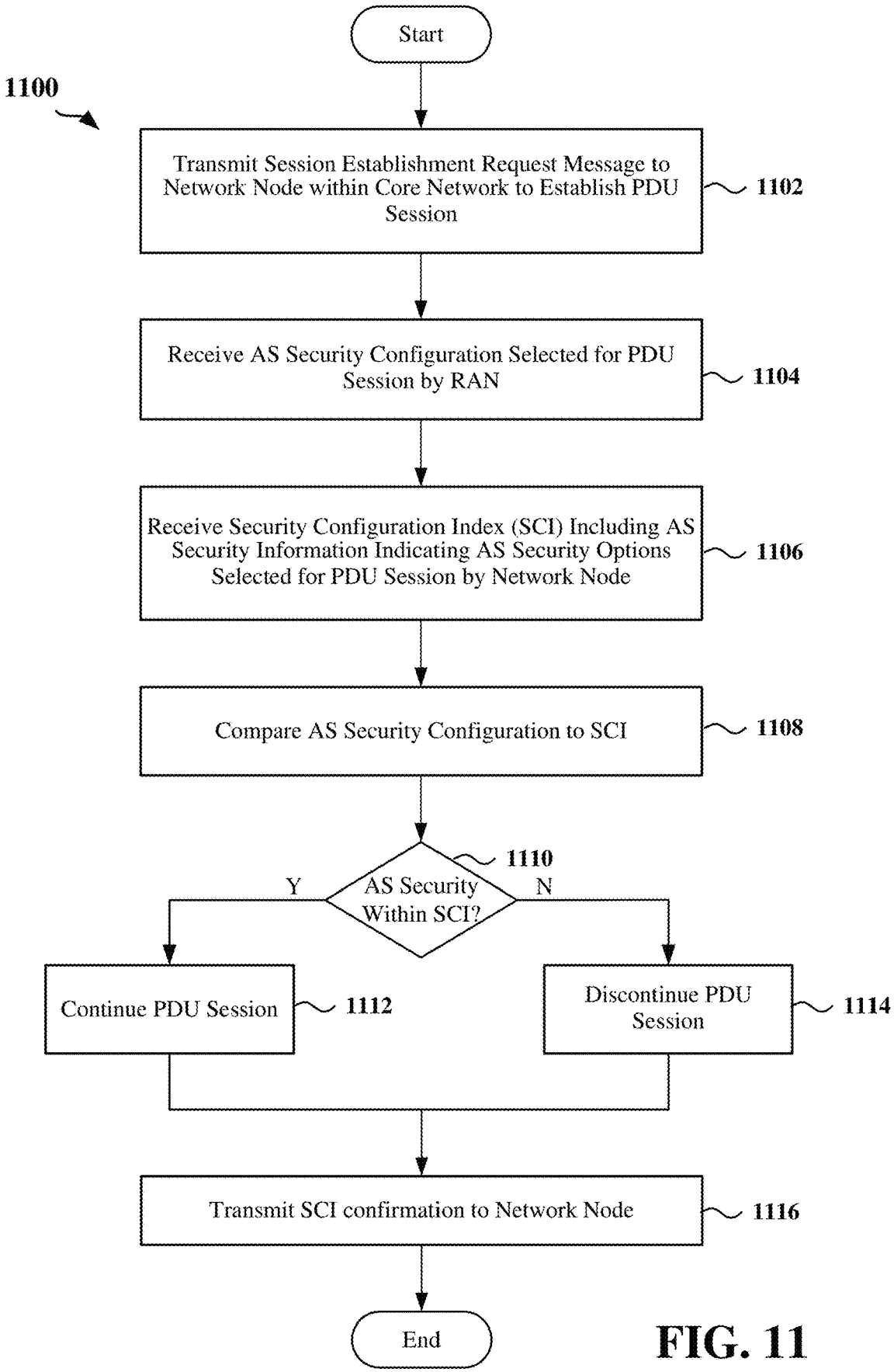
FIG. 11 is a flow chart of another exemplary method for configuring access stratum (AS) security at a user equipment in a communication network.

FIG. 11 is a flow chart 1100 of a method for configuring access stratum (AS) security at a user equipment (UE) in a communication network. As described below, some or all illustrated features may be omitted in a particular implementation within the scope of the present disclosure, and some illustrated features may not be required for implementation of all embodiments. In some examples, the method may be performed by the UE 900, as described above and illustrated in FIG. 9, by a processor or processing system, or by any suitable means for carrying out the described functions.

At block 1102, the UE may transmit a session establishment request message to a network node within a core network to establish a protocol data unit (PDU) session or data flow within a PDU session with an external data network. In some examples, the session establishment request message may include AS security capabilities of the UE. In some examples, the AS security capabilities may include a list of UE-supported security configuration indexes (SCIs) and/or an SCI request for the PDU session. For example, the UL traffic and control channel generation and transmission circuitry 942 and transceiver 910 shown and described above in connection with FIG. 9 may generate and transmit the session establishment request message.

At block 1104, the UE may receive an AS security configuration selected for the PDU session by a radio access network (RAN) serving the UE. The AS security configuration may indicate, for example, the particular AS security algorithm(s) selected for AS integrity protection and/or AS ciphering of various types of information/user data traffic (e.g., RRC messages (control plane messages), user plane data (PDUs) and/or other types of control messages). For example, the AS security configuration may indicate an AS security algorithm selected for AS integrity protection of RRC messages and an AS security algorithm selected for AS ciphering of PDUs. The AS security configuration may be transmitted, for example, within a RRC connection reconfiguration message transmitted by the RAN (e.g., gNB). For example, the DL traffic and control channel reception and processing circuitry 944 and transceiver 910 shown and described above in connection with FIG. 9 may receive the AS security configuration.

At block 1106, the UE may receive security configuration information, such as a security configuration index (SCI), including AS security information indicating one or more AS security options selected by the network node within the core network for the PDU session (or data flow). The SCI may be transmitted within, for example, the RRC connection reconfiguration message transmitted by the RAN (e.g., gNB). The SCI may further include a MAC for integrity protection of the SCI. The AS security information included in the SCI may indicate, for example, whether integrity protection and ciphering are enabled/disabled for AS messages, AS PDUs, and UPF PDUs. The AS security information included in the SCI may further indicate the security algorithms allowed (e.g., optional or mandatory, together with a possible order of preference) for each enabled security type (e.g., AS integrity protection, AS ciphering, UPF integrity protection, UPF ciphering). The AS security information included in the SCI may further include a selected QoS for the PDU session (or data flow). For example, the DL traffic and control channel reception and processing circuitry 944 and transceiver 910 shown and described above in connection with FIG. 9 may receive the SCI.

At block 1108, the UE may compare the AS security configuration with the SCI to determine, at block 1110, whether the AS security configuration is included within the SCI. For example, the AS security management circuitry 946 shown and described above in connection with FIG. 9 may compare the AS security configuration with the SCI.

If the AS security configuration is included in the SCI (Y branch of block 1110), at block 1112, the UE may continue the PDU session. For example, the UE may transmit an RRC connection reconfiguration complete message to the RAN that includes a PDU session continue indicator that indicates that the UE is continuing with the PDU session (or data flow). For example, the AS security management circuitry 946 and UL traffic and control channel generation and transmission circuitry 942 shown and described above in connection with FIG. 9 may continue the PDU session and generate the RRC connection reconfiguration complete message including the PDU session continue indicator.

However, if the AS security configuration is not included within the SCI (N branch of block 1110), at block 1114, the UE may discontinue the PDU session. For example, the UE may include a PDU session discontinue indicator in the RRC connection reconfiguration complete message that indicates that the UE is discontinuing the PDU session. In some examples, the UE may further include the received SCI (together with an optional UE MAC) within the RRC connection reconfiguration complete message. For example, the AS security management circuitry 946 and UL traffic and control channel generation and transmission circuitry 942 shown and described above in connection with FIG. 9 may discontinue the PDU session and generate the RRC connection reconfiguration complete message including the PDU session discontinue indicator.

At block 1116, the UE may transmit an SCI confirmation to the network node in the core network. In some examples, the SCI conformation may be transmitted within an RRC Connection Reconfiguration complete message to the RAN, which may then transmit a PDU session request acknowledgement message/PDU update request message including the SCI confirmation to the network node. In some examples, the RRC Connection Reconfiguration complete message and PDU session request acknowledgement message/PDU update request message may further include a PDU session continue/discontinue indicator that indicates whether the UE is continuing or discontinuing the PDU session (or data flow within the PDU session), together with an optional UE MAC to integrity protect the SCI confirmation transmitted from the UE. For example, the AS security management circuitry 946 and UL traffic and control channel generation and transmission circuitry 942, together with the transceiver 910, shown and described above in connection with FIG. 9 may transmit the SCI confirmation.

Figure 12:
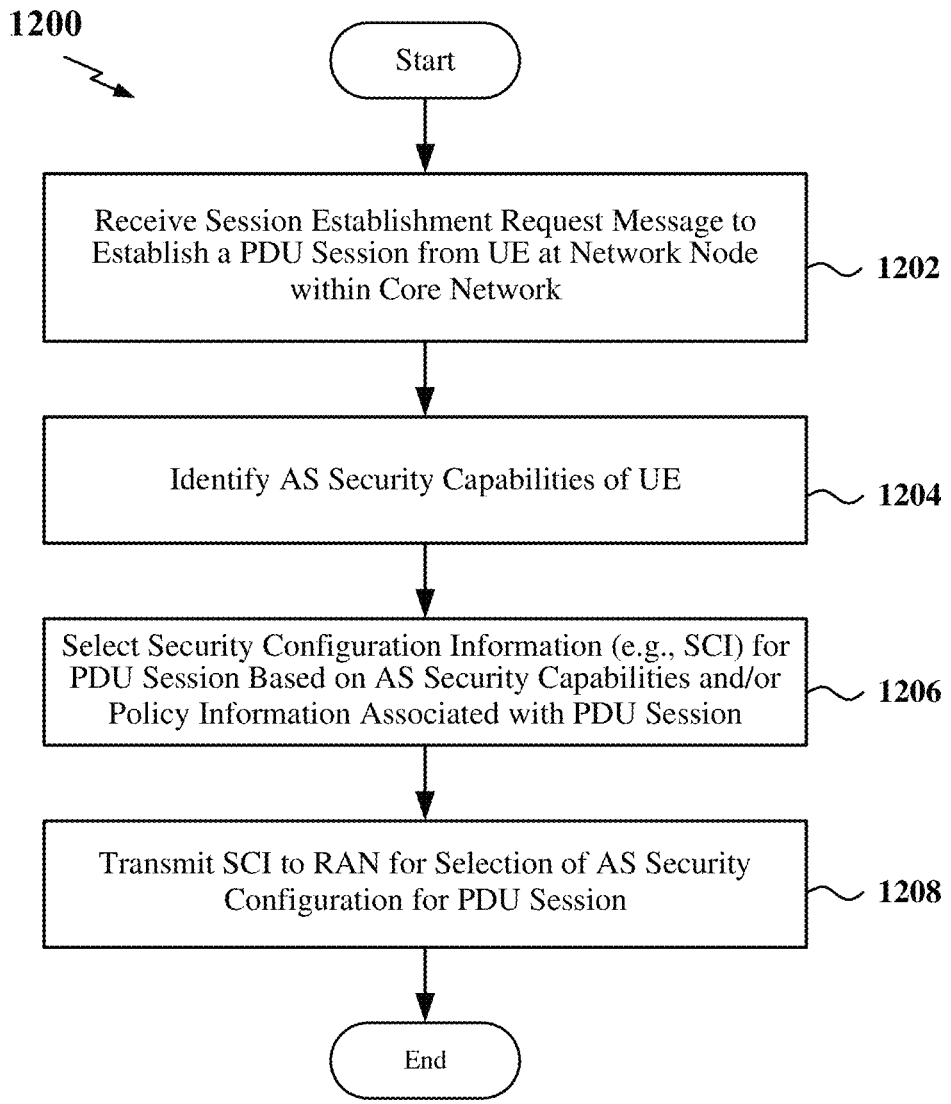
FIG. 12 is a flow chart of an exemplary method for configuring AS security for a user equipment at a network node in a core network.

FIG. 12 is a flow chart 1200 of a method for configuring access stratum (AS) security for a user equipment (UE) at a network node in a core network. As described below, some or all illustrated features may be omitted in a particular implementation within the scope of the present disclosure, and some illustrated features may not be required for implementation of all embodiments. In some examples, the method may be performed by a core network node, as described above and illustrated in FIG. 8, by a processor or processing system, or by any suitable means for carrying out the described functions.

At block 1202, the core network node may receive a session establishment request message from the UE that requests the establishment of a PDU session (or data flow within the PDU session). In some examples, the session establishment request message may include the AS security capabilities of the UE, which may also include a list of supported SCIs and/or an SCI request for the PDU session. For example, the session management circuitry 841 and network interface 810 shown and described above in connection with FIG. 8 may receive the session establishment request message.

At block 1204, the core network node may identify the AS security capabilities of the UE. In some examples, the AS security capabilities may be received within the session establishment request message. In other examples, the AS security capabilities may be maintained by the core network node or retrieved from another core network node. For example, the session management circuitry 841 shown and described above in connection with FIG. 8 may identify the AS security capabilities of the UE.

At block 1206, the core network node may select security configuration information, such as an SCI, for the PDU session (or data flow) based on at least the AS security capabilities of the UE and/or policy information associated with the PDU session. The policy information may include a UE profile, UE subscription information, AF profile, flow information, device type of the UE, and/or other network policies. For example, the SCI selection circuitry 842 shown and described above in connection with FIG. 8 may select the SCI for the PDU session.

At block 1208, the core network node may transmit the security configuration information (e.g., SCI) to the RAN serving the UE for selection of an AS security configuration for the PDU session. In some examples, the RAN may utilize the SCI to select the AS security configuration (e.g., the AS security configuration may be included in the SCI). In other examples, the RAN may select an AS security configuration outside of the SCI (e.g., the AS security configuration may be excluded from the SCI). For example, the SCI selection circuitry 842 and network interface 810 shown and described above in connection with FIG. 8 may transmit the SCI to the RAN.

Figure 13:
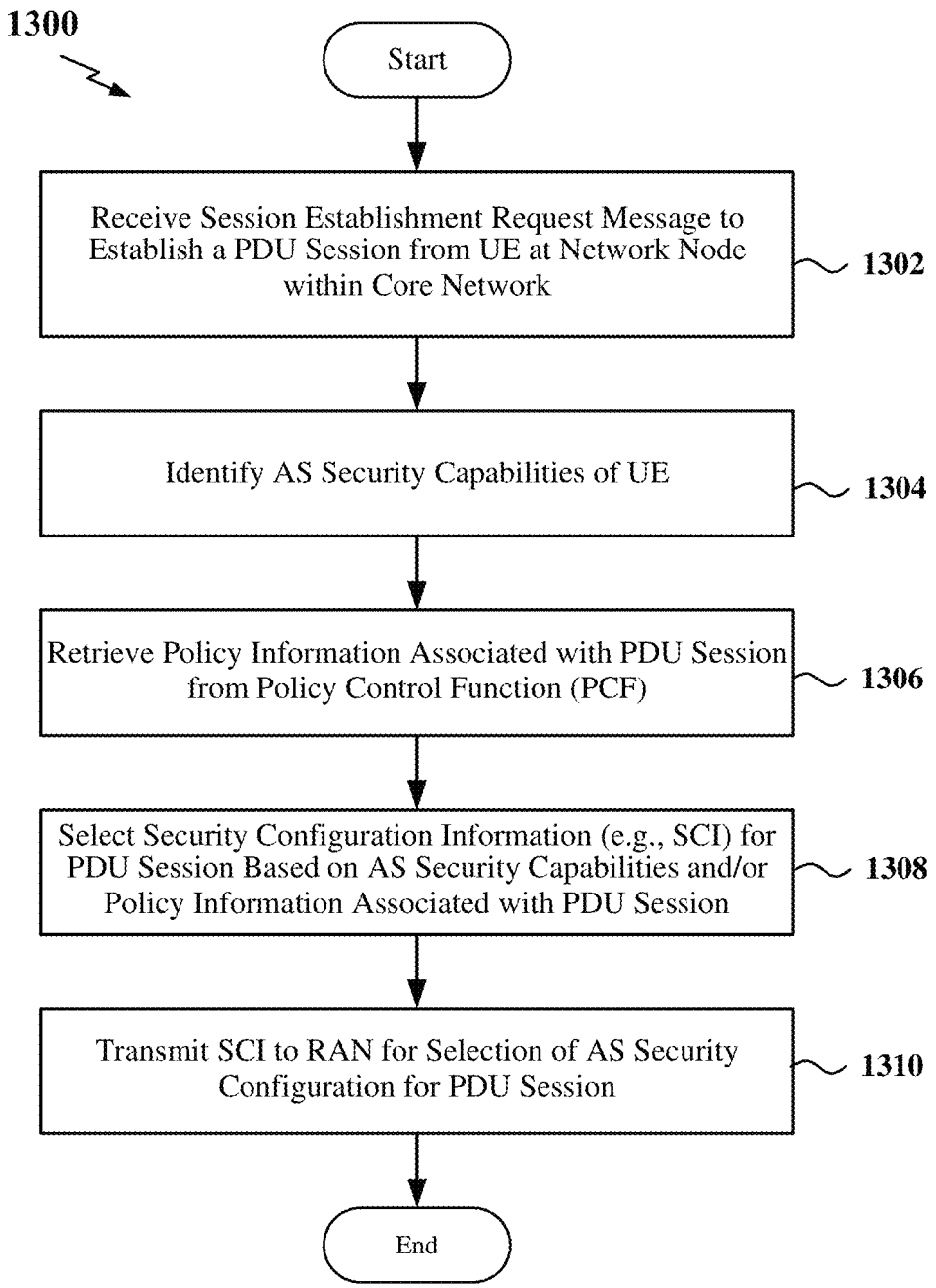
FIG. 13 is a flow chart of another exemplary method for configuring AS security for a user equipment at a network node in a core network.

FIG. 13 is a flow chart 1300 of a method for configuring access stratum (AS) security for a user equipment (UE) at a network node in a core network. As described below, some or all illustrated features may be omitted in a particular implementation within the scope of the present disclosure, and some illustrated features may not be required for implementation of all embodiments. In some examples, the method may be performed by a core network node, as described above and illustrated in FIG. 8, by a processor or processing system, or by any suitable means for carrying out the described functions.

At block 1302, the core network node may receive a session establishment request message from the UE that requests the establishment of a PDU session (or data flow within the PDU session). In some examples, the session establishment request message may include the AS security capabilities of the UE, which may also include a list of supported SCIs and/or an SCI request for the PDU session. For example, the session management circuitry 841 and network interface 810 shown and described above in connection with FIG. 8 may receive the session establishment request message.

At block 1304, the core network node may identify the AS security capabilities of the UE. In some examples, the AS security capabilities may be received within the session establishment request message. In other examples, the AS security capabilities may be maintained by the core network node or retrieved from another core network node. For example, the session management circuitry 841 shown and described above in connection with FIG. 8 may identify the AS security capabilities of the UE.

At block 1306, the core network node may retrieve policy information associated with the PDU session from a Policy Control Function (PCF) within the core network. For example, the core network node may request the policy information for the PDU session from the PCF. In some examples, the PCF may retrieve the policy information, such as session security information contained in UE subscription information or an AF profile, from the AF for the PDU session. Thus, the policy information may include one or more of the UE subscription information including the session security information retrieved from the AF, AF profile received from the AF, UE subscription information maintained at the PCF, a UE profile maintained at the PCF and/or other network policies (e.g., UPF security capabilities of the core network and/or UPF security requirements for the application). In some examples, the UE profile may indicate AS security capabilities of the UE, which may include a list of one or more SCIs supported by the UE and/or a list of one or more SCIs to be utilized for the particular application. In some examples, the policy information returned to the core network node may include a selected SCI selected for the PDU session by the PCF (or by the AF) based on the AS security capabilities of the UE and/or other policy information associated with the PDU session (e.g., UE subscription information, device type of the UE and other network policies). For example, the session management circuitry 841 and/or SCI selection circuitry 842, together with the network interface 810, shown and described above in connection with FIG. 8 may retrieve the policy information from the PCF.

At block 1308, the core network node may select security configuration information, such as an SCI, for the PDU session (or data flow) based on at least the AS security capabilities of the UE and/or policy information associated with the PDU session. For example, the SCI selection circuitry 842 shown and described above in connection with FIG. 8 may select the SCI for the PDU session.

At block 1310, the core network node may transmit the security configuration information (e.g., SCI) to the RAN serving the UE for selection of an AS security configuration for the PDU session. In some examples, the RAN may utilize the SCI to select the AS security configuration (e.g., the AS security configuration may be included in the SCI). In other examples, the RAN may select an AS security configuration outside of the SCI (e.g., the AS security configuration may be excluded from the SCI). For example, the SCI selection circuitry 842 and network interface 810 shown and described above in connection with FIG. 8 may transmit the SCI to the RAN.

Figure 14:
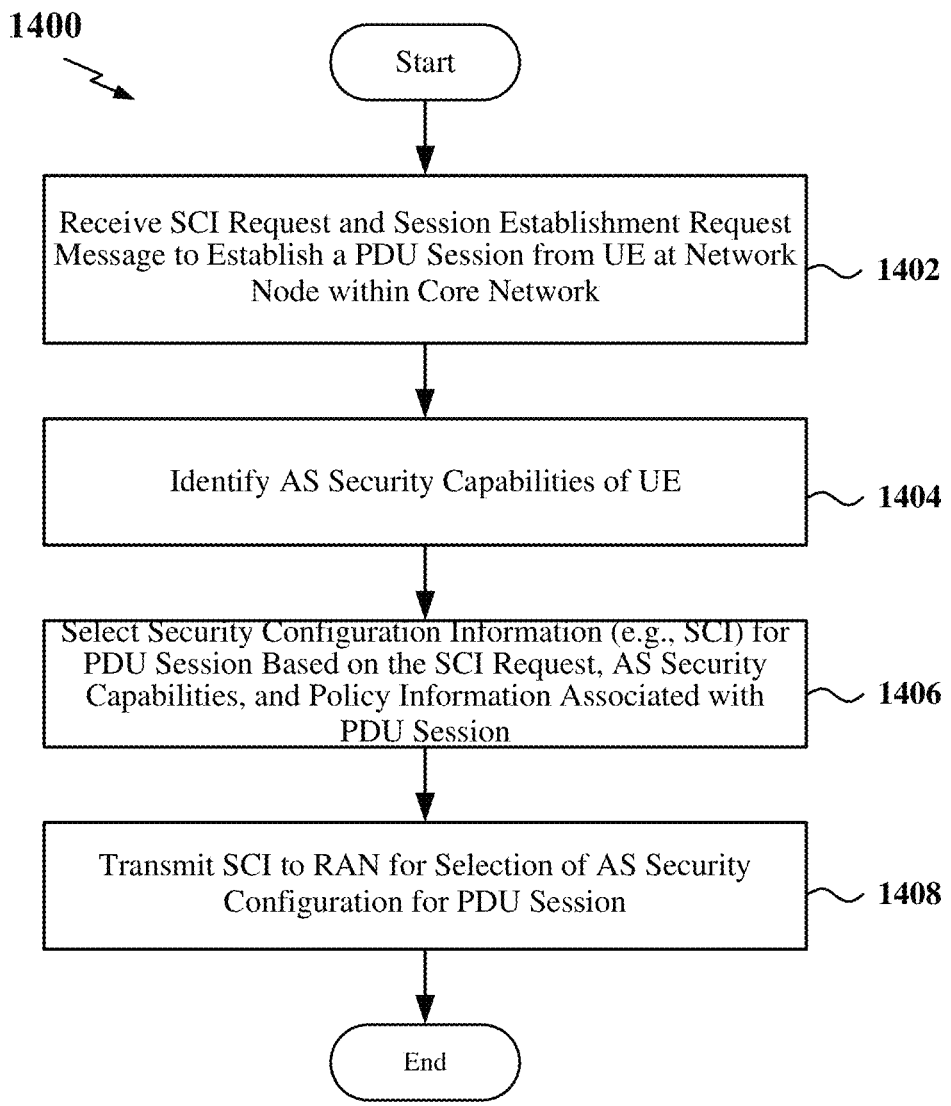
FIG. 14 is a flow chart of another exemplary method for configuring AS security for a user equipment at a network node in a core network.

FIG. 14 is a flow chart 1400 of a method for configuring access stratum (AS) security for a user equipment (UE) at a network node in a core network. As described below, some or all illustrated features may be omitted in a particular implementation within the scope of the present disclosure, and some illustrated features may not be required for implementation of all embodiments. In some examples, the method may be performed by a core network node, as described above and illustrated in FIG. 8, by a processor or processing system, or by any suitable means for carrying out the described functions.

At block 1402, the core network node may receive a session establishment request message from the UE that requests the establishment of a PDU session (or data flow within the PDU session). In addition, the core network node may receive, together with the session establishment request message, an SCI request indicating a requested SCI to be utilized for the PDU session or data flow (QoS flow) within the PDU session. In some examples, the session establishment request message may include the AS security capabilities of the UE. For example, the session management circuitry 841 and network interface 810 shown and described above in connection with FIG. 8 may receive the SCI request and session establishment request message.

At block 1404, the core network node may identify the AS security capabilities of the UE. In some examples, the AS security capabilities may be received within the session establishment request message. In other examples, the AS security capabilities may be maintained by the core network node or retrieved from another core network node. For example, the session management circuitry 841 shown and described above in connection with FIG. 8 may identify the AS security capabilities of the UE.

At block 1406, the core network node may select security configuration information, such as an SCI, for the PDU session (or data flow) based on at least the SCI Request, AS security capabilities of the UE and policy information associated with the PDU session. The policy information may include a UE profile, UE subscription information, AF profile, flow information, device type of the UE, and/or other network policies. For example, the SCI selection circuitry 842 shown and described above in connection with FIG. 8 may select the SCI for the PDU session.

At block 1408, the core network node may transmit the security configuration information (e.g., SCI) to the RAN serving the UE for selection of an AS security configuration for the PDU session. In some examples, the RAN may utilize the SCI to select the AS security configuration (e.g., the AS security configuration may be included in the SCI). In other examples, the RAN may select an AS security configuration outside of the SCI (e.g., the AS security configuration may be excluded from the SCI). For example, the SCI selection circuitry 842 and network interface 810 shown and described above in connection with FIG. 8 may transmit the SCI to the RAN.

Figure 15:
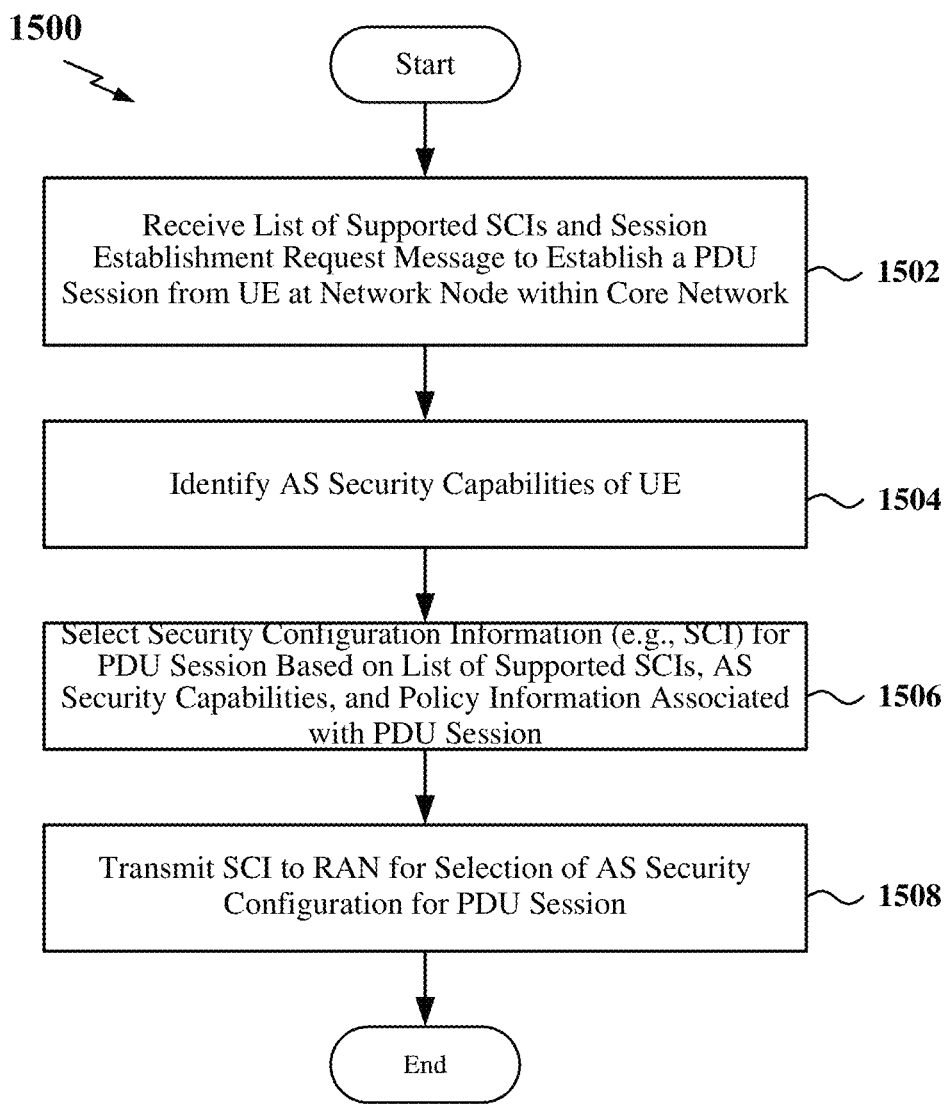
FIG. 15 is a flow chart of an exemplary method for configuring AS security for a user equipment at a network node in a core network.

FIG. 15 is a flow chart 1500 of a method for configuring access stratum (AS) security for a user equipment (UE) at a network node in a core network. As described below, some or all illustrated features may be omitted in a particular implementation within the scope of the present disclosure, and some illustrated features may not be required for implementation of all embodiments. In some examples, the method may be performed by a core network node, as described above and illustrated in FIG. 8, by a processor or processing system, or by any suitable means for carrying out the described functions.

At block 1502, the core network node may receive a session establishment request message from the UE that requests the establishment of a PDU session (or data flow within the PDU session). In addition, the core network node may receive, together with the session establishment request message, a list of supported SCIs that may be utilized for the PDU session (or data flow within the PDU session). In some examples, the session establishment request message may include the AS security capabilities of the UE. For example, the session management circuitry 841 and network interface 810 shown and described above in connection with FIG. 8 may receive the list of supported SCIs and session establishment request message.

At block 1504, the core network node may identify the AS security capabilities of the UE. In some examples, the AS security capabilities may be received within the session establishment request message. In other examples, the AS security capabilities may be maintained by the core network node or retrieved from another core network node. For example, the session management circuitry 841 shown and described above in connection with FIG. 8 may identify the AS security capabilities of the UE.

At block 1506, the core network node may select security configuration information, such as an SCI, for the PDU session (or data flow) based on at least the list of supported SCIs, AS security capabilities of the UE and/or policy information associated with the PDU session. The policy information may include a UE profile, UE subscription information, AF profile, flow information, device type of the UE, and/or other network policies. For example, the SCI selection circuitry 842 shown and described above in connection with FIG. 8 may select the SCI for the PDU session.

At block 1508, the core network node may transmit the security configuration information (e.g., SCI) to the RAN serving the UE for selection of an AS security configuration for the PDU session. In some examples, the RAN may utilize the SCI to select the AS security configuration (e.g., the AS security configuration may be included in the SCI). In other examples, the RAN may select an AS security configuration outside of the SCI (e.g., the AS security configuration may be excluded from the SCI). For example, the SCI selection circuitry 842 and network interface 810 shown and described above in connection with FIG. 8 may transmit the SCI to the RAN.

Figure 16:
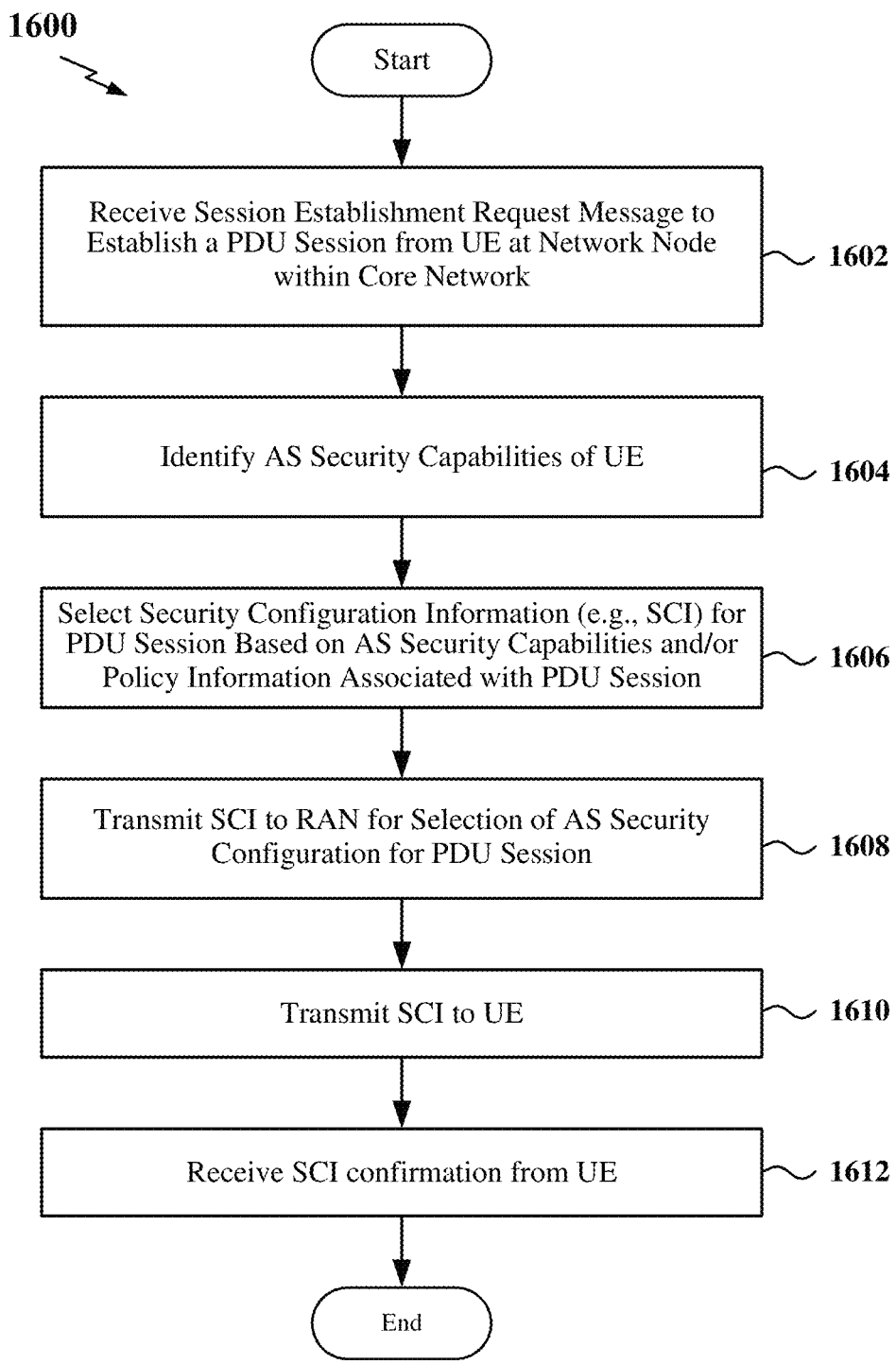
FIG. 16 is a flow chart of an exemplary method for configuring AS security for a user equipment at a network node in a core network.

FIG. 16 is a flow chart 1600 of a method for configuring access stratum (AS) security for a user equipment (UE) at a network node in a core network. As described below, some or all illustrated features may be omitted in a particular implementation within the scope of the present disclosure, and some illustrated features may not be required for implementation of all embodiments. In some examples, the method may be performed by a core network node, as described above and illustrated in FIG. 8, by a processor or processing system, or by any suitable means for carrying out the described functions.

At block 1602, the core network node may receive a session establishment request message from the UE that requests the establishment of a PDU session (or data flow within the PDU session). In some examples, the session establishment request message may include the AS security capabilities of the UE, which may also include a list of supported SCIs and/or an SCI request for the PDU session. For example, the session management circuitry 841 and network interface 810 shown and described above in connection with FIG. 8 may receive the session establishment request message.

At block 1604, the core network node may identify the AS security capabilities of the UE. In some examples, the AS security capabilities may be received within the session establishment request message. In other examples, the AS security capabilities may be maintained by the core network node or retrieved from another core network node. For example, the session management circuitry 841 shown and described above in connection with FIG. 8 may identify the AS security capabilities of the UE.

At block 1606, the core network node may select security configuration information, such as an SCI, for the PDU session (or data flow) based on at least the AS security capabilities of the UE and/or policy information associated with the PDU session. The policy information may include a UE profile, UE subscription information, AF profile, flow information, device type of the UE, and/or other network policies. For example, the SCI selection circuitry 842 shown and described above in connection with FIG. 8 may select the SCI for the PDU session.

At block 1608, the core network node may transmit the security configuration information (e.g., SCI) to the RAN serving the UE for selection of an AS security configuration for the PDU session. In some examples, the RAN may utilize the SCI to select the AS security configuration (e.g., the AS security configuration may be included in the SCI). In other examples, the RAN may select an AS security configuration outside of the SCI (e.g., the AS security configuration may be excluded from the SCI). For example, the SCI selection circuitry 842 and network interface 810 shown and described above in connection with FIG. 8 may transmit the SCI to the RAN.

At block 1610, the core network node may transmit the security configuration information (e.g., SCI) to the UE. In some examples, the SCI may further include a message authentication code (MAC) to enable the UE to verify the integrity of the SCI. In some examples, the SCI may be transmitted to both the RAN and the UE in the same message, and may be included in one or more subsequent messages transmitted to the RAN and UE downstream. The SCI may be consumed (e.g., read/utilized) by both the RAN and the UE, whereas the MAC may be consumed by only the UE. For example, the SCI selection circuitry 842 and network interface 810 shown and described above in connection with FIG. 8 may transmit the SCI to the UE.

At block 1612, the core network node may receive a security configuration confirmation (e.g., SCI confirmation) from the UE. For example, the SCI confirmation may be received within a PDU session request acknowledgement message/PDU update request message transmitted from the RAN/AMF in response to the RAN receiving an RRC Connection Reconfiguration message including the SCI confirmation. In some examples, the RRC Connection Reconfiguration complete message and PDU session request acknowledgement message/PDU update request message may further include a UE MAC to integrity protect the SCI confirmation transmitted from the UE. For example, the session management circuitry 841 and/or SCI selection circuitry 842, together with the network interface 180, shown and described above in connection with FIG. 8 may receive the SCI confirmation.

Figure 17:
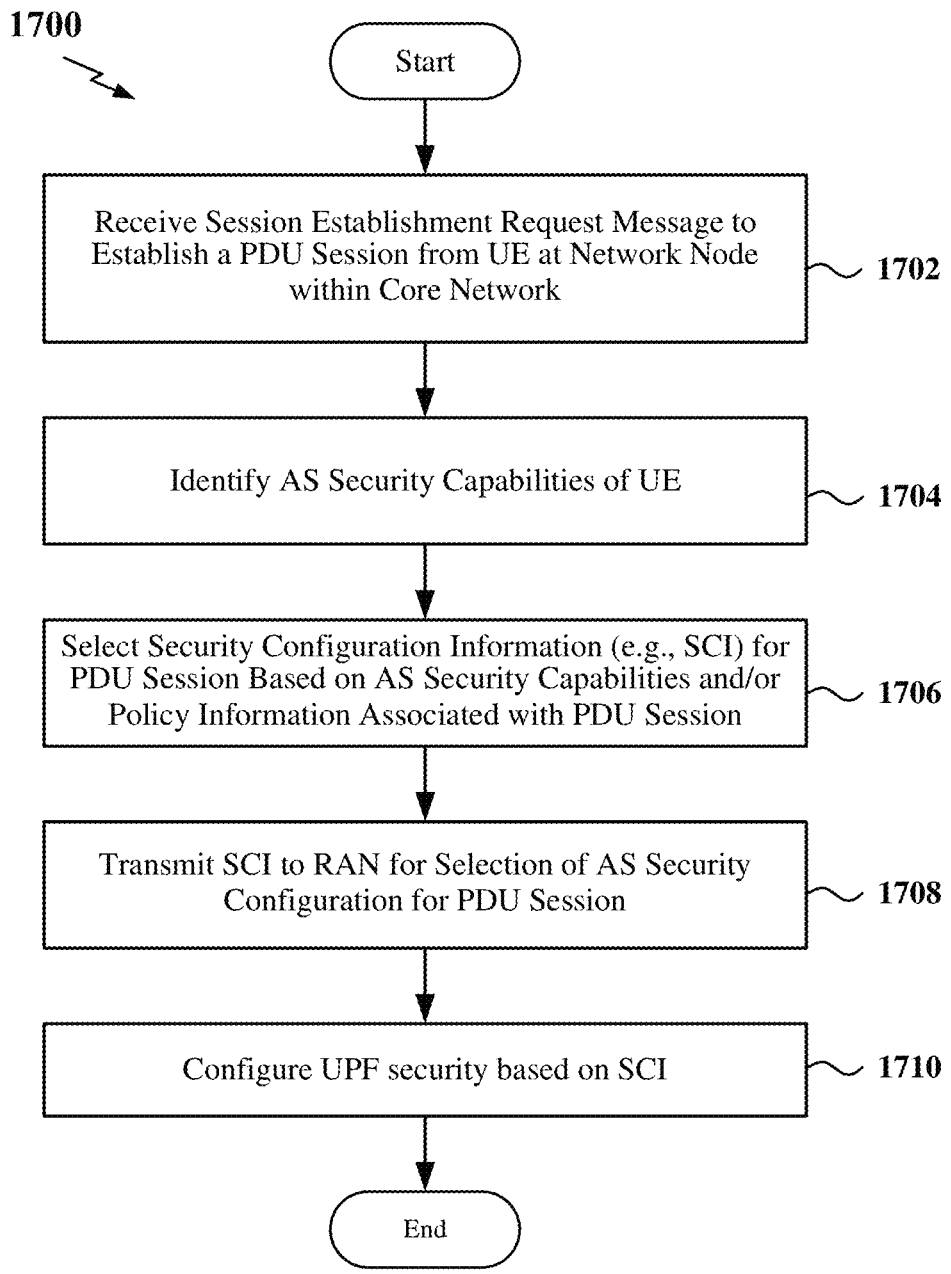
FIG. 17 is a flow chart of an exemplary method for configuring AS security for a user equipment at a network node in a core network.

FIG. 17 is a flow chart 1700 of a method for configuring access stratum (AS) security for a user equipment (UE) at a network node in a core network. As described below, some or all illustrated features may be omitted in a particular implementation within the scope of the present disclosure, and some illustrated features may not be required for implementation of all embodiments. In some examples, the method may be performed by a core network node, as described above and illustrated in FIG. 8, by a processor or processing system, or by any suitable means for carrying out the described functions.

At block 1702, the core network node may receive a session establishment request message from the UE that requests the establishment of a PDU session (or data flow within the PDU session). In some examples, the session establishment request message may include the AS security capabilities of the UE, which may also include a list of supported SCIs and/or an SCI request for the PDU session. For example, the session management circuitry 841 and network interface 810 shown and described above in connection with FIG. 8 may receive the session establishment request message.

At block 1704, the core network node may identify the AS security capabilities of the UE. In some examples, the AS security capabilities may be received within the session establishment request message. In other examples, the AS security capabilities may be maintained by the core network node or retrieved from another core network node. For example, the session management circuitry 841 shown and described above in connection with FIG. 8 may identify the AS security capabilities of the UE.

At block 1706, the core network node may select security configuration information, such as an SCI, for the PDU session (or data flow) based on at least the AS security capabilities of the UE and/or policy information associated with the PDU session. The policy information may include a UE profile, UE subscription information, AF profile, flow information, device type of the UE, and/or other network policies. For example, the SCI selection circuitry 842 shown and described above in connection with FIG. 8 may select the SCI for the PDU session.

At block 1708, the core network node may transmit the security configuration information (e.g., SCI) to the RAN serving the UE for selection of an AS security configuration for the PDU session. In some examples, the RAN may utilize the SCI to select the AS security configuration (e.g., the AS security configuration may be included in the SCI). In other examples, the RAN may select an AS security configuration outside of the SCI (e.g., the AS security configuration may be excluded from the SCI). For example, the SCI selection circuitry 842 and network interface 810 shown and described above in connection with FIG. 8 may transmit the SCI to the RAN.

At block 1710, the core network node may configure a user plane function (UPF) security for the PDU session based on the SCI. The UPF security policies may enable integrity protection and ciphering (encryption) of user plane data over the core network. In some examples, the UPF security policy may include one or more selected security algorithms to utilize for user plane data integrity protection and encryption at the UPF 320 over the core network. For example, the UPF security configuration circuitry 843 shown and described above in connection with FIG. 8 may implement the UPF security policy with the UPF within the core network.

In one configuration, an apparatus in communication network includes means for transmitting a session establishment request message to a network node within a core network to establish a protocol data unit (PDU) session and means for receiving an AS security configuration selected for the PDU session by a radio access network (RAN) serving the UE based on security configuration information including AS security information indicating one or more AS security options selected by the network node within the core network for the PDU session, in which the AS security configuration is specific to the PDU session.

In one aspect, the aforementioned means for transmitting a session establishment request message and the means for receiving an AS security configuration may be the processor(s) 904 shown in FIG. 9 configured to perform the functions recited by the aforementioned means. For example, the aforementioned means for transmitting the session establishment request message may include the UL traffic and control channel generation and transmission circuitry 942, together with the transceiver 910, shown in FIG. 9. As another example, the aforementioned means for receiving the AS security configuration may include the DL traffic and control channel reception and processing circuitry 944, together with the transceiver 910, shown in FIG. 9. In still another aspect, the aforementioned means may be a circuit or any apparatus configured to perform the functions recited by the aforementioned means.

In another configuration, a network node in a core network includes means for receiving a session establishment request message from the UE at the network node within the core network, in which the session establishment request message includes a request for the UE to establish a protocol data unit (PDU) session. The network node further includes means for identifying AS security capabilities of the UE and means for selecting security configuration information for the PDU session based on at least one of the AS security capabilities of the UE or policy information associated with the PDU session, in which the security configuration information includes AS security information indicating one or more AS security options selected by the network node within the core network for the PDU session. The network node further includes means for transmitting the security configuration information to a radio access network (RAN) in wireless communication with the UE for selection of an AS security configuration for the PDU session.

In one aspect, the aforementioned means for receiving a session establishment request message, means for identifying AS security capabilities, means for selecting security configuration information, and means for transmitting the security configuration information to a RAN may be the processor(s) 804 shown in FIG. 7 configured to perform the functions recited by the aforementioned means. For example, the aforementioned means for receiving a session establishment request message may include the session management circuitry 841, together with the network interface 810, shown in FIG. 8. As another example, the aforementioned means for identifying AS security capabilities may include the session management circuitry 841, shown in FIG. 8. As yet another example, the aforementioned means for selecting the security configuration information may include the SCI selection circuitry 842, shown in FIG. 8. As yet another example, the aforementioned means for transmitting the security configuration information to the RAN may include the SCI selection circuitry 842, together with the network interface 810, shown in FIG. 8. In still another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 4, and 7-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for configuring Access Stratum (AS) security at a user equipment (UE) configured for communication in a communication network, comprising:
    transmitting a session establishment request message to a network node within a core network to establish a protocol data unit (PDU) session;
    receiving an AS security configuration selected for the PDU session by a radio access network (RAN) serving the UE from a RAN node, the AS security configuration being specific to the PDU session;
    receiving security configuration information comprising AS security information indicating one or more AS security options selected for the PDU session by the network node within the core network from the network node, each of the AS security configuration and AS security information indicating a respective control plane and user plane security configuration to securely deliver radio resource control (RRC) messages and user plane data between the UE and the RAN node;
    comparing, by the UE, the AS security configuration to the security configuration information;
    continuing, by the UE, the PDU session when the AS security configuration is included within the security configuration information; and
    discontinuing, by the UE, the PDU session when the AS security configuration is excluded from the security configuration information.

2. The method of claim 1, wherein the security configuration information comprises a message authentication code (MAC), and further comprising:
    verifying an integrity of the security configuration information using the MAC.

3. The method of claim 1, further comprising:
    transmitting a security configuration confirmation and a UE message authentication code for the security configuration confirmation to the network node within the core network.

4. The method of claim 1, wherein the security configuration information is selected based on a Quality of Service (QoS) flow within the PDU session and the AS security configuration is selected for the QoS flow within the PDU session.

5. The method of claim 1, wherein the security configuration information is selected based on a device type of the UE or the PDU session.

6. The method of claim 1, wherein the security configuration information comprises a security configuration index (SCI), and wherein transmitting the session establishment request message further comprises:
transmitting an SCI request for the PDU session together with the session establishment request message.

7. The method of claim 1, wherein transmitting the session establishment request message further comprises:
transmitting a list of supported security configuration indexes (SCIs) together with the session establishment request message.

8. The method of claim 1, wherein transmitting the session establishment request message further comprises:
transmitting AS security capabilities of the UE together with the session establishment request message.

9. The method of claim 1, wherein the security configuration information comprises an AS ciphering indicator indicating whether AS ciphering is enabled and an AS integrity protection indicator indicating whether AS integrity protection is enabled.

10. The method of claim 9, wherein the security configuration information further comprises a user plane function (UPF) ciphering indicator indicating whether UPF ciphering is enabled and a UPF integrity protection indicator indicating whether UPF integrity protection is enabled.

11. The method of claim 9, wherein the security configuration information further comprises a list of one or more AS security algorithms and indicates whether each of the one or more AS security algorithms is enabled.

12. The method of claim 11, wherein the security configuration information further indicates an order of preference of each of the one or more AS security algorithms.

13. The method of claim 11, wherein the security configuration information further indicates whether each of the one or more AS security algorithms is mandatory.

14. The method of claim 9, wherein the security configuration information further comprises a quality of service (QoS) field indicating one or more QoS parameters for the PDU session.

15. The method of claim 9, wherein the AS ciphering indicator is applicable to radio resource control (RRC) signaling messages and user plane data and the AS integrity protection indicator is applicable to at least the RRC signaling messages.

16. The method of claim 15, wherein the security configuration information further comprises at least one additional security indicator for one or more other control messages other than the RRC signaling messages exchanged between the RAN and the UE.

17. The method of claim 16, wherein the one or more other control messages comprise at least one of a status report message, a physical uplink control channel (PUCCH), or a physical downlink control channel (PDCCH).

18. A user equipment (UE) configured for communication within a communication network, comprising:
a processor;
a wireless transceiver communicatively coupled to the processor; and
a memory communicatively coupled to the processor, wherein the processor is configured to:
transmit a session establishment request message to a network node within a core network to establish a protocol data unit (PDU) session via the transceiver;
receive, via the transceiver, an AS security configuration selected for the PDU session by a radio access network (RAN) serving the UE from a RAN node, the AS security configuration being specific to the PDU session;
receive, via the transceiver, security configuration information comprising AS security information indicating one or more AS security options selected for the PDU session by the network node within the core network from the network node, each of the AS security configuration and AS security information indicating a respective control plane and user plane security configuration to securely deliver radio resource control (RRC) messages and user plane data between the UE and the RAN node;
compare, by the processor within the UE, the AS security configuration to the security configuration information;
continue, by the processor within the UE, the PDU session when the AS security configuration is included within the security configuration information; and
discontinue, by the processor within the UE, the PDU session when the AS security configuration is excluded from the security configuration information.

19. The UE of claim 18, wherein the security configuration information comprises a message authentication code (MAC), and wherein the processor is further configured to:
verify an integrity of the security configuration information using the MAC.

20. The UE of claim 18, wherein the processor is further configured to:
transmit a security configuration confirmation and a UE message authentication code for the security configuration confirmation to the network node within the core network.

21. The UE of claim 18, wherein the security configuration information is selected based on a Quality of Service (QoS) flow within the PDU session and the AS security configuration is selected for the QoS flow within the PDU session.

22. The UE of claim 18, wherein the security configuration information is selected based on at least one of a device type of the UE or the PDU session.

23. The UE of claim 18, wherein the security configuration information comprises a security configuration index (SCI), and wherein the processor is further configured to:
transmit a list of supported security configuration indexes (SCIs) together with the session establishment request message.

24. The UE of claim 18, wherein the processor is further configured to:
transmit AS security capabilities of the UE together with the session establishment request message.

25. The UE of claim 18, wherein the security configuration information comprises an AS ciphering indicator indicating whether AS ciphering is enabled, an AS integrity protection indicator indicating whether AS integrity protection is enabled, a user plane function (UPF) ciphering indicator indicating whether UPF ciphering is enabled, and a UPF integrity protection indicator indicating whether UPF integrity protection is enabled.

26. The UE of claim 25, wherein the security configuration information further comprises a list of one or more AS security algorithms and indicates whether each of the one or more AS security algorithms is enabled.

27. The UE of claim 26, wherein the security configuration information further indicates an order of preference of each of the one or more AS security algorithms and whether each of the one or more AS security algorithms is mandatory.

28. The UE of claim 25, wherein the security configuration information further comprises a quality of service (QoS) field indicating one or more QoS parameters for the PDU session.

29. An apparatus, comprising:
means for transmitting a session establishment request message to a network node within a core network to establish a protocol data unit (PDU) session;
means for receiving an AS security configuration selected for the PDU session by a radio access network (RAN) serving the apparatus from a RAN node, the AS security configuration being specific to the PDU session;
means for receiving security configuration information comprising AS security information indicating one or more AS security options selected for the PDU session by the network node within the core network from the network node, each of the AS security configuration and AS security information indicating a respective control plane and user plane security configuration to securely deliver radio resource control (RRC) messages and user plane data between the apparatus and the RAN node;
means for comparing, by the apparatus, the AS security configuration to the security configuration information;
means for continuing, by the apparatus, the PDU session when the AS security configuration is included within the security configuration information; and
means for discontinuing, by the apparatus, the PDU session when the AS security configuration is excluded from the security configuration information.

30. The apparatus of claim 29, further comprising:
means for transmitting a security configuration confirmation and a UE message authentication code for the security configuration confirmation to the network node within the core network.

31. The apparatus of claim 29, wherein the security configuration information further comprises a list of AS security algorithms and indicates whether each of the AS security algorithms is enabled.

32. The apparatus of claim 31, wherein the security configuration information further indicates an order of preference of each of the AS security algorithms.

33. The apparatus of claim 31, wherein the security configuration information further indicates whether each of the AS security algorithms is mandatory.

34. The apparatus of claim 29, wherein the security configuration information comprises an AS ciphering indicator indicating whether AS ciphering is enabled and an AS integrity protection indicator indicating whether AS integrity protection is enabled, the AS ciphering indicator being applicable to radio resource control (RRC) signaling messages and user plane data and the AS integrity protection indicator being applicable to at least the RRC signaling messages.

35. The apparatus of claim 34, wherein the security configuration information further comprises at least one additional security indicator for one or more other control messages other than the RRC signaling messages exchanged between the RAN and the apparatus.

36. The apparatus of claim 35, wherein the one or more other control messages comprise at least one of a status report message, a physical uplink control channel (PUCCH), or a physical downlink control channel (PDCCH).

* * * * *